United States Patent
Margolus et al.

(10) Patent No.: US 7,412,462 B2
(45) Date of Patent: Aug. 12, 2008

(54) DATA REPOSITORY AND METHOD FOR PROMOTING NETWORK STORAGE OF DATA

(75) Inventors: Norman H. Margolus, Somerville, MA (US); Thomas F. Knight, Jr., Belmont, MA (US); Jered J. Floyd, Cambridge, MA (US); Sam Hartman, Cambridge, MA (US); George E. Homsy, II, Cambridge, MA (US)

(73) Assignee: Burnside Acquisition, LLC, Cambridge, MA (US)

( * ) Notice: Subject to any disclaimer, the term of this patent is extended or adjusted under 35 U.S.C. 154(b) by 0 days.

(21) Appl. No.: 09/785,535

(22) Filed: Feb. 16, 2001

(65) Prior Publication Data

US 2002/0038296 A1 Mar. 28, 2002

Related U.S. Application Data

(60) Provisional application No. 60/183,466, filed on Feb. 18, 2000.

(51) Int. Cl.
*G06F 17/30* (2006.01)
(52) U.S. Cl. .......................... 707/200; 707/10; 713/176; 713/180; 713/181; 709/203; 705/18; 705/51
(58) Field of Classification Search ................. 707/10, 707/204, 200; 713/189, 193, 200–202, 176, 713/180, 181; 709/203; 705/51, 18
See application file for complete search history.

(56) References Cited

U.S. PATENT DOCUMENTS 4,641,274 A 2/1987 Swank (Continued)

FOREIGN PATENT DOCUMENTS

EP 0774715 5/1997

(Continued)

OTHER PUBLICATIONS

Tridgell et al., The Rsync Algorithm, Jun. 18, 1996, Department of Computer Science Australian National University Canberra, pp. 1-6.*

(Continued)

*Primary Examiner*—Hung Q Pham
(74) *Attorney, Agent, or Firm*—Fish & Richardson P.C.

(57) ABSTRACT

In general, the invention features methods by which more than one client program connected to a network stores the same data item on a storage device of a data repository connected to the network. In one aspect, the method comprises encrypting the data item using a key derived from the content of the data item, determining a digital fingerprint of the data item, and storing the data item on the storage device at a location or locations associated with the digital fingerprint. In a second aspect, the method comprises determining a digital fingerprint of the data item, testing for whether the data item is already stored in the repository by comparing the digital fingerprint of the data item to the digital fingerprints of data items already in storage in the repository, and challenging a client that is attempting to deposit a data item already stored in the repository, to ascertain that the client has the full data item.

37 Claims, 11 Drawing Sheets

U.S. PATENT DOCUMENTS

| | | | | |
|---|---|---|---|---|
| 4,864,616 | A | * | 9/1989 | Pond et al. ............... 713/165 |
| RE34,954 | E | | 5/1995 | Haber et al. ............... 380/49 |
| 5,532,920 | A | | 7/1996 | Hartrick et al. |
| 5,579,501 | A | * | 11/1996 | Lipton et al. ............... 711/216 |
| 5,594,227 | A | * | 1/1997 | Deo ............... 235/380 |
| 5,765,152 | A | | 6/1998 | Erickson ............... 707/9 |
| 5,778,395 | A | | 7/1998 | Whiting et al. ............... 707/204 |
| 5,781,901 | A | * | 7/1998 | Kuzma ............... 707/10 |
| 5,852,666 | A | | 12/1998 | Miller et al. |
| 5,914,938 | A | * | 6/1999 | Brady et al. ............... 370/254 |
| 5,915,025 | A | | 6/1999 | Taguchi et al. ............... 380/44 |
| 5,931,947 | A | | 8/1999 | Burns et al. |
| 5,940,507 | A | | 8/1999 | Cane et al. |
| 5,978,791 | A | | 11/1999 | Farber et al. ............... 707/2 |
| 5,990,810 | A | | 11/1999 | Williams |
| 6,041,411 | A | | 3/2000 | Wyatt |
| 6,052,688 | A | * | 4/2000 | Thorsen ............... 707/100 |
| 6,122,631 | A | | 9/2000 | Berbec et al. |
| 6,148,342 | A | * | 11/2000 | Ho ............... 709/225 |
| 6,205,533 | B1 | | 3/2001 | Margolus ............... 712/13 |
| 6,272,492 | B1 | | 8/2001 | Kay |
| 6,308,325 | B1 | * | 10/2001 | Dobbek ............... 717/11 |
| 6,374,266 | B1 | * | 4/2002 | Shnelvar ............... 707/204 |
| 6,415,280 | B1 | | 7/2002 | Farber et al. |
| 6,415,302 | B1 | * | 7/2002 | Garthwaite et al. ............... 707/206 |
| 6,430,618 | B1 | | 8/2002 | Karger et al. |
| 6,526,418 | B1 | * | 2/2003 | Midgley et al. ............... 707/204 |
| 6,532,542 | B1 | * | 3/2003 | Thomlinson et al. ............... 713/187 |
| 6,535,867 | B1 | * | 3/2003 | Waters ............... 707/1 |
| 6,549,992 | B1 | * | 4/2003 | Armangau et al. ............... 711/162 |
| 6,557,102 | B1 | * | 4/2003 | Wong et al. ............... 713/176 |
| 6,584,466 | B1 | | 6/2003 | Serbinis et al. |
| 6,601,172 | B1 | | 7/2003 | Epstein |
| 2003/0028761 | A1 | | 2/2003 | Platt |

FOREIGN PATENT DOCUMENTS

| | | |
|---|---|---|
| EP | 1 049 988 B1 | 9/2002 |
| EP | 1 049 989 B1 | 5/2003 |
| WO | 99/09480 | 2/1999 |
| WO | WO 01/18633 | 3/2001 |
| WO | WO 01/61563 | 8/2001 |

OTHER PUBLICATIONS

Chaum et al., "Utraceable Electronic Cash", Advances in Cryptology CRYPTO '88, Springer-Verlag, pp. 319-327 (1998).

Feige et al., "Zero-Knowledge Proofs of Identity, "Journal of Cryptology 1:77-94 (1988).

Margolus, Crystalline Computation, Chapter 18 of Feynman and Computation (A. Hey, ed.), Perseus Books, pp. 267-305 (1999).

National Institute of Standards and Technology, NIST FIPS PUB 180-1, "Secure Hash Standard", U.S. Department of Commerce (Apr. 1995).

Nowicki, "NFS: Network File System Protocol Specification" Network Working Group RFC1094, Sun Microsystems, Inc. (Mar. 1989).

Preface from FWKCS(TM) Contents_Signature System, Version 2.05, Copyright Frederick W. Kantor (Apr. 26, 1996).

Rabin, "Efficient Dispersal of Information for Security," Load Balancing, and Fault Tolerance, Journal of the ACM, vol. 36, No. 2, pp. 335-348 (Apr. 1989).

Rivest, "The MD4 Message Digest Algorithm," Network Working Group RFC1186, MIT Laboratory for Computer Science (Oct. 1990).

Karger et al., "Consistent Hashing and Random Trees: Distributed Caching Protocols for Relieving Hot Spots on the World Wide Web," Laboratory for Computer Science and Department of Mathematics, MIT, Cambridge, MA.

Berners-Lee et al., "Universal Document Identifiers," available at http://www.webhistory.org/www-talk.1992/0032.html (Mar. 11, 1992).

Bowman et al., "Harvest: A Scalable, Customizable Discovery and Access System," Technical Report CU-CS-732-94, Dept. of Comp. Science, Univ. of Colorado (Aug. 1994).

Browne et al., "Location-Independent Naming for Virtual Distributed Software Repositories," available at www.netlib.org/utk/papers/lefn/main.html (Nov. 11, 1994).

Crespo et al., "Archival Storage for Digital Libraries," Procs. of the Third ACM Conf. on Digital Libraries, pp. 69-78 (ISBN: 0-89791-965-3) (1998).

Heckel, "A Technique for Isolating Differences Between Files," Communications of the ACM, vol. 21, No. 4 (Apr. 1978).

Kaliski, "PKCS #1: RSA Encryption," Mar. 1998, The Internet Society, Request for Comments 2313, pp. 1-19, http://www.ietf.org/rfc/rfc2313.txt.

Kantor, FWKCS™ Contents_Signature System, Version 1.18 (Sep. 11, 1992).

Rabin, "Fingerprinting by Random Polynomials," Center for Research in Computing Technology, Harvard University, Technical Report TR-15-81 (1981).

Rivest, "The MD5 Message-Digest Algorithm," Network Working Group, Request for Comments: 1321, MIT Lab for Comp. Science and RSA Data Security, Inc. (Apr. 1992).

Sollins, "Functional Requirements for Uniform Resource Names," Network Working Group, Request for Comments: 1737, MIT Lab. For Comp. Science (Dec. 1994).

Williams, "An Introduction to Digest Algorithms," available at ftp.rocksoft.com:/pub/rocksoft/., (Sep. 1994).

* cited by examiner

DATA REPOSITORY AND METHOD FOR PROMOTING NETWORK STORAGE OF DATA

CROSS-REFERENCE TO RELATED APPLICATIONS

This application claims priority from U.S. Provisional Application Ser. No. 60/183,466, filed Feb. 18, 2000.

BACKGROUND OF THE INVENTION

For almost as long as there have been computer networks, there have been schemes which allow computers to access each other's file systems over the network in much the same manner as they access their own local file system. The first widely used remote file access protocol was Sun Microsystems' network file system (NFS), which became very popular with the rise of Unix in the mid 1980's (see B. Nowicki, "NFS: Network File System Protocol Specification," Network Working Group RFC1094, March 1989). At about the same time, the SMB network file sharing protocol was developed by IBM for use with their PC's. Subsequent versions of SMB have become widely used on networked PC's running Microsoft Windows, and on their fileservers.

Keeping data in networked file systems allows users to access the same data environment from different workstations on the network, and greatly simplifies system administration and the sharing of public data. For these and other reasons, it is expected that network data repositories will become widely popular among PC users as soon as typical PC network connections become fast enough to make substantial remote storage of data practical. Indeed, some Web-based services which make specific types of user data accessible from any Web browser are already popular—for example, email services and appointment calendars. Servers for individuals' Web pages also follow the network-data model.

Many companies are offering additional Web-based services which store their data remotely, seeking new applications that will become popular. Some of these companies also offer substantial amounts of free network-based file storage. The greatest obstacle to the acceptance of these new network-based services has been slow network connections. Most computer users currently connect to the network through a telephone modem, which provides them with a connection that is about 1000 times slower than the I/O bandwidth to their local hard disk. This makes it relatively inconvenient to use remote network-based storage for most of the applications that these users now run on their local file system.

Some companies currently sell network-based backup services to PC users. For a fee, these companies provide a combination of PC software and networked storage space that allows users to keep a copy of their most important data remotely. For privacy, the PC software encrypts user data before sending it to be stored, using the user's individual public key. Some of these companies also offer Web-based access to backed-up data. Thus far, these companies have not achieved an appreciable penetration into the PC user market. Slow network connections, the cost and effort involved in obtaining and using such services, and a low perceived benefit attached to maintaining backups of file data, have been major obstacles. For the moment, most of the Gigabytes of programs and data that users accumulate remain exclusively on their local hard disks.

Use of network storage is also encouraged by techniques which speed up network file transfers. One such technique involves the concept of a "digital fingerprint" of a file, also called a "hash function", a "content signature" or a "message digest" (see R. L. Rivest, "MD4 Message Digest Algorithm," Network Working Group RFC1186, October 1990). A fingerprint is a fixed-length value obtained by mixing all of the bits of the file together in some prescribed deterministic manner—the same data always produces the same fingerprint. The fingerprint is used as a compact representative of the whole file: if two file fingerprints don't match, then the files are different. For a well designed fingerprint, the chance that any two actual files will ever have the same fingerprint can be made arbitrarily small. Such a fingerprint serves as a unique name for the file data.

Fingerprints have been used for many years to avoid unnecessary file transfers. One application of this sort has been in Bulletin Board Systems (BBSs), which have used fingerprints since the early 1990's to avoid the communication cost of uploading file data that is already present in the BBS, but associated with a different file name. Fingerprints have also been used in BBSs to conserve storage space by not storing duplicate data (for an example of both uses, see Frederick W. Kantor's Content Signature software, FWKCS, which has been in use by bulletin boards such as Channel 1 since at least 1993). These BBSs maintain a table of fingerprints for all files already present. When a new file is uploaded for storage on the BBS, its fingerprint is taken. If the BBS already contains a file with the same fingerprint (regardless of the file's name) then the duplicate data is not stored. Similarly, a client computer wishing to store data into the BBS can compute the fingerprint of the file that it wishes to send, and send that first. If a file containing this data is already present in the BBS, then the client is informed and need not send anything.

D. A. Farber and R. D. Lachman, in U.S. Pat. No. 5,978,791 (Data processing system using substantially unique identifiers to identify data items, whereby identical data items have the same identifiers, filed October 1997) carry the idea of file fingerprints a step further, using them as the primary identifier for all data-items stored in a file system. In their scheme, not only are fingerprints used to avoid unnecessary transmission and duplicate-storage of file data (as in the BBS scheme mentioned above), but they also use fingerprints directly to gain read access to data. In this scheme, access to "licensed" data is controlled by associating explicit lists of licensees with specific data-items. Such a control mechanism doesn't scale well when applied to intellectual property protection in general. Any data-item added to the system which is copyrighted, for example, would have to have attached to it an explicit list of all users who are legally allowed to read it. Otherwise someone can give out access to the data-item to everyone that uses the file system by anonymously publishing the fingerprint of the data-item. Constructing an explicit legal-access list for each data-item is in general cumbersome, difficult and intrusive.

Furthermore, existing schemes which use fingerprints to identify redundant data and avoid unnecessary transmission and storage depend upon the storage system being able to examine previously stored data. If users independently encrypt their data for privacy, they can't take advantage of each others data to save on transmission or on storage. If data is unencrypted, then the storage system maintainers have complete access to all user data. They may be tempted or coerced into looking at this data, and in some situations may be legally obliged to provide parts of it to third parties.

SUMMARY OF THE INVENTION

In general, the invention features a method by which more than one client program connected to a network stores the same data item on a storage device of a data repository connected to the network. The method comprises encrypting the data item using a key derived from the content of the data item, determining a digital fingerprint of the data item, and storing the data item on the storage device at a location or locations associated with the digital fingerprint.

In preferred implementations, one or more of the following features may be incorporated. The method may further include testing for whether a data item is already stored in the repository by comparing a digital fingerprint of the data item to digital fingerprints of data items already in storage in the repository. The same digital fingerprint may be used for storing the data item on the storage device and for testing whether a data item is already stored in the repository. Encrypting of the data item may be performed by the client prior to transmitting the data item to the storage device. The method may further include encrypting the key and storing the encrypted key on the storage device or on another storage device connected to the network. A client or user specific key may be used to encrypt the key derived from the content of the data item. The key derived from the content of the data item may be the same for all copies of the data item stored in the repository. Users of the method may be grouped into families, and the key derived from the content of the data item may be the same for all copies of the data item stored in the repository by users in the same family, but may be different for users in different families. One or more additional copies or other forms of redundant information about the data items may be stored on the storage device or on other storage devices connected to the network for data integrity, availability, or accessibility purposes and not to provide separate storage of the data item for different client programs. The method may further include associating the data item with each of a plurality of access-authorization credentials, each of which is uniquely associated with a particular user or client program. The method may further include associating the data item with each of a plurality of access-authorization credentials, each of which is uniquely associated with a particular user or client program. Associating of the data item with each of a plurality of access-authorization credentials may include storing a plurality of named objects, each named object comprising information representative of the data item paired with information representative of one of the access-authorization credentials. The information representative of the data item may be a digital fingerprint. The information representative of the access-authorization credential may be a cryptographic hash of all or part of the access-authorization credential. The cryptographic hash may be an access identifier that uniquely identifies the data item for a particular user or client program. The named object may be a data structure created by the client program. The named object may be a data structure created by a server program acting on behalf of the repository. The method may further include a client replacing an existing version of a data item stored on the storage device with a new version of that data item, by replacing the existing named object with a new named object. The method may further include a client retrieving a data item by accessing a named object using an access-authorization credential to select the named object, and using the contents of the named object to determine the location of the data item on the storage device. The named objects may further include version information associating different data items with different versions of the named object. A backup of data items stored on the storage device may be accomplished by preserving copies of the current versions of named objects in existence at the time of the backup. Data items associated with named objects may not be deleted from the repository, and wherein records are kept of the association between data items and names in order to define named objects, and wherein named objects may be backed up by preserving copies of the named object records in existence at the time of the backup. A backup of data items stored on the storage device may be accomplished by preserving copies of the current versions of named objects in existence at the time of the backup. A plurality of backups may be made at spaced time intervals. The backup may be accomplished by declaring that after a prescribed moment in time a new version of each named object will be created the first time that a new data item is associated with it. The prescribed moment in time is determined separately for each named object. Copies of named objects may be preserved by creating a new version of each named object each time that a new data item is associated with it. Versions of named objects that are deemed unnecessary may be deleted. The determination of which versions of a named object to delete may be based in whole or in part on the times at which the versions were created, and the intervals between these times. The method may further include preparing a digital time stamp of a plurality of named objects to allow a property of these named objects to be proven at a later date. A random or other difficult to guess element may be incorporated into the time stamp hash for each named object, to prevent the property from being proven if this element is deleted. The method may further include determining that a data item stored on the storage device is not referenced by any named object, and reusing the storage space used to store the unreferenced data item. The method may further include altering one or more properties or parameters associated with an access-authorization credential to change the access rights of a client or user to the data item referenced by that credential. The method may further include a challenge step to ascertain that the client has the full data item. The challenge step may require that the client attempting to store a data item provide correct answers to inquiries as to the content of portions of the data item. The data item content on which the challenge is based may be selected with a degree of randomness. Depositors may use the client to store data items in the repository, and at least some depositors may be required to provide identification upon storing at least some data items. Rules for when a depositor must provide identification may be selected in order to discourage unlawful distribution of access to the data item. There may be a greater degree of user identification or a higher likelihood that user identification will be required when the data item being stored by the depositor has been indicated to be shareable with other users. For a class of data items the items may only be shared if the depositor has provided adequate identification. Identity information about the depositor may be made available to anyone able to access the data item, to discourage unlawful sharing. The identity information may be stored in an encrypted form that the depositor and users subsequently accessing the shared data item can both read. The repository may not have access to the identity information about the depositor. There may be trial users of the repository, and the identity of such trial users may not have not been well verified, but restrictions may be placed on sharing of data items deposited by such trial users. The method may further include limiting access to data items deposited by a poorly verified trial user. Limited access may be provided by limiting the aggregate bandwidth provided for such accesses. Limited access may be provided by limiting the number of simultaneous accesses to the data items. The client may have a directory structure for the data items, the data items may be stored in the repository, and the directory structure may not be evident to the repository maintainers. The client program using the repository may determine which data items to deposit in the repository, and wherein that determination may be based at least in part on the result of a comparison of digital fingerprints establishing that certain data items are not in the repository. Mirroring software may be downloaded to the client using a bootstrap process, wherein a small bootstrap program may be downloaded and executed, and the bootstrap program may manage download and installation of the remainder of the mirroring software. The default for deciding what data items to mirror may be to mirror all data items. The mirroring may include making a determination of which data items need to be transmitted to the repository, and wherein that determination may be based primarily on a comparison of digital fingerprints for data items at the client and data items in the repository. The access-authorization credential may be determined in part by computing a hash involving elements of the pathname for a file on the client computer. The path name hash may be made unique to a client by introducing a reproducible but randomly chosen element into it. A data item may be represented as a composite of objects, and the component objects may be separately deposited in the repository. Lists of fingerprints for data-items making up a composite data-item may be deposited as an index data item, which can be given an object-name and used for obtaining access to any of the component data-items. A proof-of-deposit may be returned for each component deposit, and the proofs may be presented when the index data item is given an object-name. When transmitting a composite data-item, the client may use fingerprints to avoid retransmitting components following loss of communication. The composite data-item may be encrypted with a key that is only made available to the repository at the moment of access. An email message may be broken up into composite items in such a manner that the individual attachments may be separate component data-items. The physical location at which information about named-objects is stored may be based on access identifiers, to introduce reproducible pseudorandomness into the physical locations of the named-object data. Fingerprints may be determined directly from the data items, and this process produces randomly distributed numbers which can be used to introduce reproducible pseudorandomness into the physical locations of the data items. The repository may give the client a deposit receipt which allows the user to prove that the deposit occurred. An access identifier may be formed to provide proof of ownership of the data item stored in the repository, the access identifier may be formed by producing a one-way hash including identifying information chosen by the client program to identify the data item, and the one-way hash may not be reversed to permit the repository to discover the identity of the client program or user. The identifying information may be associated with the data item on the client. The identifying information may be derived at least in part from the path name of the data item on the client. User-identifying information may be provided to the repository as part of the access-authorization credential. At least some access-authorization credentials may be transferred between users without the use of the repository. At least one class of users may not be permitted to transfer access using access-authorization credentials.

In a second aspect, the invention features another method by which more than one client program connected to a network stores the same data item on a storage device of a data repository connected to the network. The method comprises determining a digital fingerprint of the data item, testing for whether a data item is already stored in the repository by comparing the digital fingerprint of the data item to the digital fingerprints of data items already in storage in the repository, and challenging a client that is attempting to deposit a data item already stored in the repository, to ascertain that the client has the full data item.

In preferred implementations, one or more of the following features may be incorporated. The challenging may require that the client provide correct answers to inquiries as to the content of portions of the data item. The data item content on which the challenge is based may not easily be predicted by the user or client program. The data item content on which the challenge is based may be determined by the client program without the aid of the repository. Future access to the data item may be provided by creating an access-authorization credential which can be presented at a later time to prove that the challenge has been met for that data item. Each access authorization credential may be uniquely associated with an access owner. Each access authorization credential may include information sufficient to identify the access owner. The access authorization credential may include a fingerprint. The fingerprint may be different from the fingerprint used for testing whether the data item is already stored in the repository. The access authorization credential may be associated with a fingerprint in the repository. The access authorization credential may be associated directly with the data-item or with a record in the repository that is associated with the data-item. The record in the repository with which the access authorization credential is associated may be an access identifier that is associated with the credential by computation of a one way hash function. The access identifier may be stored in the repository and may be compared with a later hash of an access authorization credential to verify access permission to a named object. The access authorization credential may include information sufficient to respond to a challenge. The access authorization credential may include data proof information created during a challenge process that is sufficient to prove to the repository that the challenge was passed. This data proof information may include the actual challenge response, so that it can be directly verified against the data-item. At least some access-authorization credentials may be transferred between users without the aid of the repository. The usage of some access authorization credential may be restricted for at least one class of access owners. The access authorization credential may only be usable by the access owner. The aggregate bandwidth available to all users of the access authorization credential may be limited. At the time of deposit at least some data items may be associated with a minimum expiration time. At least some data items that expire may be removed and their storage space reused. The repository may keep track of which access owners have deposited a given data item. Upon an access owner informing the repository that a data item is no longer needed, the data item may be deleted or the expiration of the data item may be accelerated. The repository may truncate the list of depositors associated with a data-item, and may never accelerates the expiration of this data item. The method may further include encrypting the data item using a key derived from the content of the data item. Encrypting of the data item may be performed by the client prior to transmitting the data item to the storage device. The method may further include encrypting the key and storing the encrypted key on the storage device or on another storage device connected to the network. A client or user specific key may be used to encrypt the key derived from the content of the data item.

In a third aspect, the invention features a method by which more than one client program connected to a network stores the same data item on a storage device of a data repository connected to the network. The method comprises determining a digital fingerprint of the data item, storing the data item on the storage device at a location or locations associated with the digital fingerprint, associating the data item with each of a plurality of access-authorization credentials, each of which is uniquely associated with an access owner, and preparing a digital time stamp of a plurality of records associating data-items and credentials, to allow a property of these records to be proven at a later date.

In preferred implementations, one or more of the following features may be incorporated. Preparing the digital time stamp may include forming a time stamp hash, and a difficult to guess or random element may be incorporated into the time stamp hash, to prevent the property from being proven if this element is deleted. All data items in the repository may be time stamped if they remain in the depository for a sufficiently long time period.

In a fourth aspect, the invention features a method for detecting the relative uniqueness of a data item in a repository of data items stored on a storage device at locations associated with their digital fingerprints. The method comprises determining a digital fingerprint of the data item, and determining (or approximating) the number of users with authorization credentials for the data item.

In preferred implementations, one or more of the following features may be incorporated. The data item may be a portion of the body of an e-mail message, and the method may be used to determine the relative uniqueness of the e-mail message in a large population of e-mail messages to determine the likelihood that the e-mail is spam. A decision as to whether a data item is a virus may be made by comparing the relative uniqueness of both the data item and other data items associated with the same application.

In a fifth aspect, the invention features a method for detecting whether a suspect data item is infected with a virus that has a uniform impact on an infected data item. The method comprises determining a digital fingerprint of the suspect data item, comparing the digital fingerprint of the suspect data item to the digital fingerprints of infected data items known to be infected with a virus that consistently affects the data item in the same manner, and basing a decision that the suspect data item contains the virus based on there being a match between the fingerprint of the suspect data item and one or more of the fingerprints of the infected data items.

In preferred implementations, one or more of the following features may be incorporated. The method may further include collecting and providing usage statistics based on number of pointers to a data item in the repository. The usage statistics may be configured to provide marketing penetration information on the data item.

In a sixth aspect, the invention features a method by which more than one client connected to a network stores the same data item on a storage device of a data repository connected to the network. The method comprises determining a digital fingerprint of the data item, testing for whether a data item is already stored in the repository by comparing the digital fingerprint of the data item to the digital fingerprints of data items already in storage in the repository, and associating with a data item an informational tag which may be read by at least some client programs.

In preferred implementations, one or more of the following features may be incorporated. The informational tag may indicate at least one of the following: whether the data item contains spam, whether the data item contains or is a virus, whether the data item is copyrighted, by whom the data item is copyrighted, what royalty payment is due for the copyright. The method may further include the process of collecting royalties or other payments for use of a copyright on a data item based on the indication of whether a data item is copy-righted. The process may enable voluntary payment of such royalties or payments. At least some of the tags may be encrypted using the same key as for each data item, so that users with the data item can read the informational contents of the tag.

In a seventh aspect, the invention features a method by which more than one client connected to a network may store the same data item on a storage device of a data repository connected to the network, and wherein there is a public data repository and a private data repository. The method comprises determining a digital fingerprint of the data item, testing for whether a data item is already stored in the public repository by comparing the digital fingerprint of the data item to the digital fingerprints of data items already in storage in the public repository, and if the data item is present in the public repository, storing a named object in the public repository associating the client with the data item and relying on storage of the data item in the public repository; and if the data item is not present in the public repository, storing a named object in the private repository and relying on storage of the data item in the private repository.

In preferred implementations, one or more of the following features may be incorporated. The client may store a named object for the data item exclusively either in the public or the private repository. The data items may be widely circulated non-electronic media such as books or music, and the method may further include converting the widely circulated non-electronic media to a standardized electronic version, storing the standardized electronic version as a data item in the repository, promoting the availability of the standardized electronic version to users with the right to have access, whereby the likelihood of the data repository storing multiple, slightly-different electronic versions of the non-electronic media is reduced.

In an eighth aspect, the invention features a method by which a client connected to a network over a lower speed connection may provide higher speed access to a data item for application processing than is possible over the relatively low speed connection to the network. The method comprises determining a digital fingerprint of the data item, testing for whether the data item is already stored in a repository by comparing the digital fingerprint of the data item to digital fingerprints of data items already in the repository, only if the data item is not already in the repository, transferring the data item over the lower speed connection from the client to the repository, the repository being connected to the network over a higher speed connection than the client, making a higher speed connection between an application server and the data repository, executing an application on the application server to process the data item stored on the data repository, and returning at least some of the processed data to the client across the lower speed connection.

In preferred implementations, one or both of the data transfers to and from the client may be conducted in the background while other applications are running on the client.

In a ninth aspect, the invention features a method by which multiple clients browse content on a network such as the Internet. The method comprises each of the multiple clients accessing content on the network via one or more proxy servers, determining the digital fingerprint of an item of content passing through the proxy server, storing the item of content in a content repository connected to the proxy server at a location associated with the digital fingerprint, testing for whether a content data item is already stored in the repository by comparing the digital fingerprint of the content data item to the digital fingerprints of content data items already in storage in the repository, associating a content data item already stored in the repository with an access authorization credential uniquely associated with an access owner.

In preferred implementations, one or more of the following features may be incorporated. The data repository may save substantially all content browsed by the clients, thereby preserving the content after it has been altered or removed from the network. The method may further include granting search engines access to the stored content data items or to information about the number of times that data items have been accessed or how recently the data items have been accessed.

In a tenth aspect, the invention features a method by which a plurality of clients connected to a network store the same broadcast data on a storage device of a data repository connected to the network, wherein the broadcast data comprises a sequence of frames or other fragments. The method comprises determining a digital fingerprint of each fragment, testing for whether the fragment is already stored in the repository by comparing a digital fingerprint of the fragment to digital fingerprints of fragments and other data items already in storage in the repository, having only the client or clients that determine that a fragment is not stored in the repository transmit the fragment to the repository, whereby because all but one or a small number of clients will not have to transmit the fragment to effect storage of the fragment to effect storage of the fragment n the repository, most of the clients are able to store the broadcast data in the repository without actually transmitting a significant fraction of the data to the repository.

In preferred implementations, the broadcast data may be video and the fragments may be frames of video. The encrypting may be performed by cellular automata, and may include dividing a data-item into segments in which at least some bits in each segment are considered to be homologous, transforming disjoint groups of homologous bits by applying a state-permutation operation separately to each group, and changing which bits are considered to be homologous and repeating the process. The arrangement of bits into segments can be expressed as having a spatial interpretation, and the spatial origin of each segment may be shifted in a manner determined by an encryption key, with bits in different segments that have the same spatial coordinates considered to be homologous. An encryption key may be used to determine what state-permutation operation is applied to each group of homologous bits in each step. Coalescence may be used for backup/mirroring in which substantially all of a personal computer's data is backed up in this fashion. The method may provide a mirroring capability for a personal computer, and mirroring software with instructions for carrying out the aforesaid steps may be preconfigured on the personal computer upon purchase. The method may provide a mirroring capability for a personal computer, and mirroring software for carrying out the method may be initially configured to mirror essentially all data on the user's computer. The method may provide a mirroring capability for a wireless network device.

In an eleventh aspect, the invention features a method for selling a backup service for backing up or mirroring data on a client computer. The method comprises accepting an unlimited amount of backup or mirroring data from a plurality of client computers, and storing the data in one or more repositories to which the client computers are connected via a network, for free or at a charge substantially less than sufficient to cover the cost of operating the backup service, charging a substantial fee, greater than the fee charged for accepting the data, for recovery of the data from the repositories.

In preferred implementations, one or more of the following features may be incorporated. The fee charged for recovery may be greater when the recovered data is provided quickly, either by express delivery of media containing the data or by delivery over a high-speed data connection. The recovery of data over a slow-speed data connection may be provided at no fee or at a charge substantially less than sufficient to cover the cost of operating the backup service. Data coalescence using digital fingerprints may be used to reduce the amount of data transmitted and stored during backup or mirroring. A charge may be made to third parties for high-speed network access to the client data resident on the repositories.

Other features and advantages of the various aspects of the invention will be apparent from the following detailed description and from the drawings.

DETAILED DESCRIPTION

Figure 1:
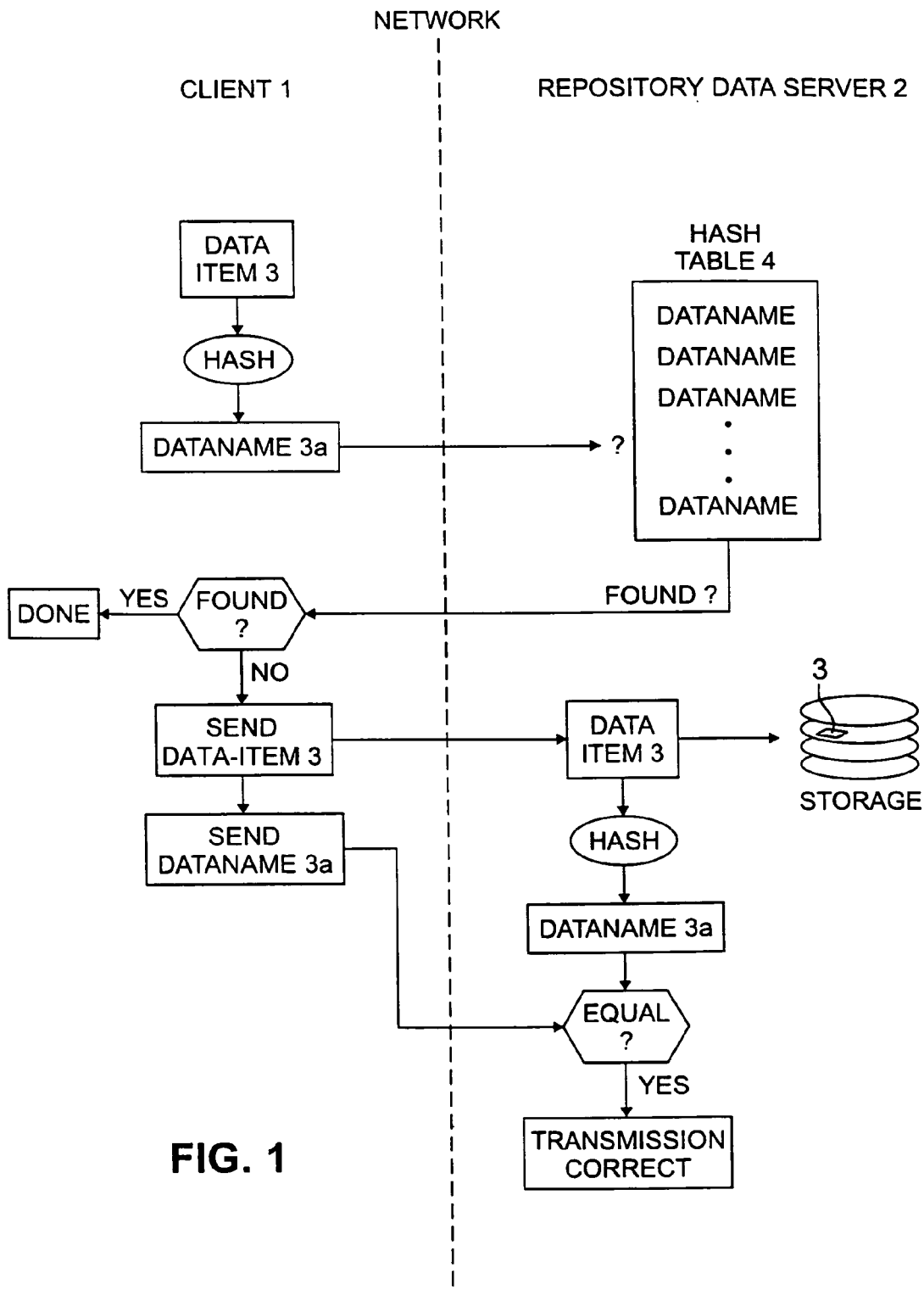
FIG. 1 is a block diagram depicting a user's query to the repository to determine if data is present, and transmit it if necessary.

This invention deals with the organization and operation of a network-based data repository and an associated data services business. This organization and method of operation are designed to make it both feasible and attractive for computer users with slow network connections to store a copy of their local file system data in remote network-connected storage. The same repository organization is also designed to provide efficient storage and data transmission for users with high-bandwidth network connections. This organization addresses feasibility and attractiveness not only in technical matters, but also in societal and legal matters, such as privacy and copyright.

The envisioned data repository consists of a set of data storage devices connected to the Internet, along with the hardware and software that link them together. These storage devices are arranged in groups at widely separated geographical locations, in order to minimize the impact of localized disasters, and to also minimize network congestion. Erasure-resilient coding techniques operating over the network are used to ensure that data is never lost (see the April 1989 paper by Michael 0. Rabin, "Efficient Dispersal of Information for Security, Load Balancing, and Fault Tolerance" in the Journal of the ACM, Volume 36 number 2, pages 335-348).

This repository is unusual in that, like the BBS systems cited above, from a logical standpoint it contains only a single copy of each data-item stored in it no matter how many repository clients (i.e., computers running software acting on behalf of human users) store files into it containing the same data-item. Any replication of data is done purely to assure data integrity (i.e., to make sure data is correct) and to improve data availability (i.e., to make sure a copy of the data is available) and accessibility (i.e., to make sure data can be accessed reasonably quickly). A pointer to a data-item already contained within this repository can be constructed directly from a copy of the same data-item present on a client computer, without the aid of the repository data-servers. Such pointers can be communicated to the repository in place of the actual data-items themselves.

The unusual organization of the repository is a key element in making significant network storage practicable for computers with slow network connections. Advantage is taken of the fact that most of the data on a typical computer duplicates data that is also present on other machines: operating system files, applications, and data files that have been downloaded over the network or copied from removable media. In order to transfer such files to the repository, client software will typically only have to send a pointer, since the repository will already contain a copy of the data, sent earlier by some other client. An important element in the scheme is arranging to share data in this manner without compromising the privacy of user data—this is accomplished by sharing encrypted data.

This is a key difference from prior art. Previous schemes have used digital fingerprints (hashes) to avoid communicating data already present at the destination. In the present scheme, the data that is communicated is first encrypted. The encryption is performed using a key derived from the data itself, and this key is never seen in an unencrypted form by the repository servers. Since independent client programs encrypt the same data-item in the same manner, fingerprints can be used to avoid duplicate communication. Unique data is automatically encrypted in a unique manner. Data-items with a length comparable to the fingerprint may be encrypted conventionally without much affect on bandwidth usage or storage. This alleviates concerns that short data-items may be decrypted by guessing them.

To further allay privacy concerns, the repository is careful to avoid storing information that is sufficient to identify who has access to a particular data-item. Additional information provided by user access credentials allows a link to be created transiently at the moment of access. This means that common data-items (such as components of popular programs) can't be traced back to their owners using data present in the repository alone. This also avoids some legal issues associated with subpoenable records.

A major concern for a widely used data repository is to avoid becoming entangled in intellectual property disputes. For example, the Farber/Lachman scheme discussed earlier doesn't deal adequately with the issue of copyright. Unless all copyrighted items are individually identified and labeled with all legal accessors, the scheme fails to protect copyright. The fingerprint of an unlabeled data-item can be broadcast anonymously, giving everyone receiving the broadcast read access to the data-item. In this scenario, the repository company would be unable to point to a responsible party other than itself. The present scheme ensures that there is always a responsible party when access is broadcast: it precludes anonymous broadcast of access. For example, assume that a client has a data-item, and wants to secure future access to a copy of this data-item which it determines, using fingerprints, is already present in the repository. That is, the client wishes to deposit the data-item into the repository without retransmitting it. The repository must determine that the depositor has more than just the fingerprint, because that could have been broadcast anonymously. It therefore challenges the depositor, asking for a small amount of information (such as a specified hash) that proves that the depositor has a copy of the full data-item, before giving the depositor access to the repository's copy of the data-item.

The initial applications contemplated for this repository are mainly archival: storing the complete contents of file systems, mirrored and available live on the network, with historical versions of files also available. The longer term applications center on the role of the repository company as a responsible party in a storage transaction marketplace. By implementing protocols that assure data integrity, persistence, privacy, accessibility and access control, and by using a scheme that avoids certain kinds of legal liability and copyright difficulties, the repository company is poised to help enable a storage transaction marketplace.

Initial Applications

In order to attract a significant volume of data from users with slow network connections, it is not only necessary to lower technical barriers, but also necessary to provide significant positive incentives. While these users can deposit much of their data quickly into the repository, they can only retrieve the actual data-items rather slowly—it isn't practical for them to use the repository in place of their local hard disk. There are, however, two practical services that can be provided which justify their depositing substantial amounts of data into the repository: file system mirroring and file system backup.

File system mirroring involves maintaining an up-to-date "mirror" copy of a user's file system within the repository. This mirror constitutes a remote network-based backup version of the local file system in a format which allows immediate network-based access to this data. To achieve this, client software is provided that runs on the user's computer and communicates with the repository data-server, automatically sending information to the repository about files that have changed. This program needs little or no configuration, and uses the client computer's processor and network resources only when they are not needed by other programs. It also performs other useful services, such as checking files for viruses. Once a copy of user data has been deposited in the repository, it is guaranteed to be safe from mishap or malicious mischief, and this data is available for use by its owner from anywhere on the network—available at all times and with high bandwidth. Some of the files mirrored in the repository could be deleted from the local file system, to save space. If a user has several PC's, all of their data that is scattered among their various machines becomes commonly available through the repository. Mirroring can also be applied to many non-PC devices (e.g., wireless personal digital assistants), further helping to consolidate user data. The owner of the mirrored data can also make their data accessible to network based applications and services: for example, portions of it can be served as Web pages, or copied directly to other network file systems. Third-party Application Service Providers (ASPs) can be given access by the users to portions of their data: for example, a system-maintenance ASP could check for software version incompatibilities in a user's data. Specific software ASP's could allow network-based versions of their software to operate on users' text and presentation documents.

Backup is performed on all repository data, including file system mirror data. The repository data server preserves historical copies of all repository data. These copies also reside in the repository but take up little space, since data-items in the repository are never actually replicated—only the metadata that associates names with data-items is actually copied. As files change, data-items which are no longer associated with any file (or backup copy of a file) may be erased from the repository, and their storage space reclaimed. For low-bandwidth users, there is little reason to ever remove any of their backup files from active storage in the repository—this data is always available. Users are able to retrieve past versions of file data. The repository data-server also periodically time-stamps file system "hash" information using digital timestamp techniques (see S. A. Haber and W. S. Stornetta, Jr., U.S. Patent USRE034954, "Method for secure time-stamping of digital documents," May 30, 1995), allowing the repository to provide incontestable legal evidence that a user had a particular file with particular contents in their file system on a given date.

For users with low-bandwidth and intermittent connectivity to the network, the repository business can provide many inducements to convince them to deposit their data in the repository, aiming to retain them as customers when their connectivity improves. In addition to lowering technical barriers, providing useful services, and guaranteeing data privacy, the business can also offer most or all services to these users for free. They are expected to soon turn into higher-bandwidth constant-connection users, who's continued patronage will provide revenue. Revenue can also be derived from ASPs providing data services to these users, particularly if the repository evolves from a data-mirror into a primary data-storage vehicle. An attractive feature of the repository in this context is that it provides safe and secure storage under the control of the end-user (unlike current network based applications such as Web-based email, which lock the user data into the ASPs database). The repository business can also expect to earn revenue from the traffic at the Web portal that users use to control their repository services and to subscribe to new services. Another potential revenue stream for both the business and the users would involve selling application usage information. Users would be paid who are willing to allow the client software to report such information. For example, information about cross-correlations between the presence of different application programs and data files in the same user's file system would be of great interest to software vendors, particularly if tied to a user name.

The Data Repository

The data repository is a distributed aggregate of data storage devices connected to the network, which together maintain a collection of data-items in a single logical address space, indexed by "datanames" (digital fingerprints) generated directly from the data-items themselves. Logically only one copy of each distinct data-item is kept in the repository, which allows for great economy in use of storage space. In practice, some redundancy is needed in order to assure data integrity, and to increase data availability and accessibility. Economical transmission of data-items which reside within the repository can be accomplished by sending the dataname in place of the data-item. This is illustrated in FIG. 1.

For each data-item 3 that a data-client 1 wishes to deposit into the repository, a cryptographic hash function (digital fingerprint) is calculated from the data-item—this is the repository dataname 3a for that data-item. Ideally, a cryptographic hash function is a fixed random mapping between arbitrarily long input bit-strings and a fixed-length output. With enough bits in the output value, such a hash is probabilistically "guaranteed" to provide a unique dataname for every distinct data-item that will ever be sent to the repository.

In this discussion it will be assumed that the repository uses a well studied public-domain hash function called SHA-1, although other choices would do as well (see National Institute of Standards and Technology, NIST FIPS PUB 180-1, "Secure Hash Standard," U.S. Department of Commerce, April 1995.) This function produces a 20-byte value. It is at present computationally infeasible to find two distinct data files that have the same SHA-1 hash value—this prevents users from intentionally confusing the repository. If it ever becomes necessary to change the hash function used to index new data-items, old datanames can still be used to retrieve old data.

To deposit a data-item 3 into the repository, the dataname 3a is first used to check whether or not the repository already contains a copy of the data-item. The data-client 1 communicates with the repository data-server 2, asking whether a given dataname 3a corresponds to an existing repository data-item. If not, the data-client sends the data 3. The repository data-server 2 independently recomputes the dataname 3a by hashing the data-item received, in order to verify correct transmission, and to avoid any danger of associating the wrong dataname with a given repository data-item. Once a data-item is in the repository, it never needs to be sent again by anyone (unless it has been removed).

Named Objects

Figure 2:
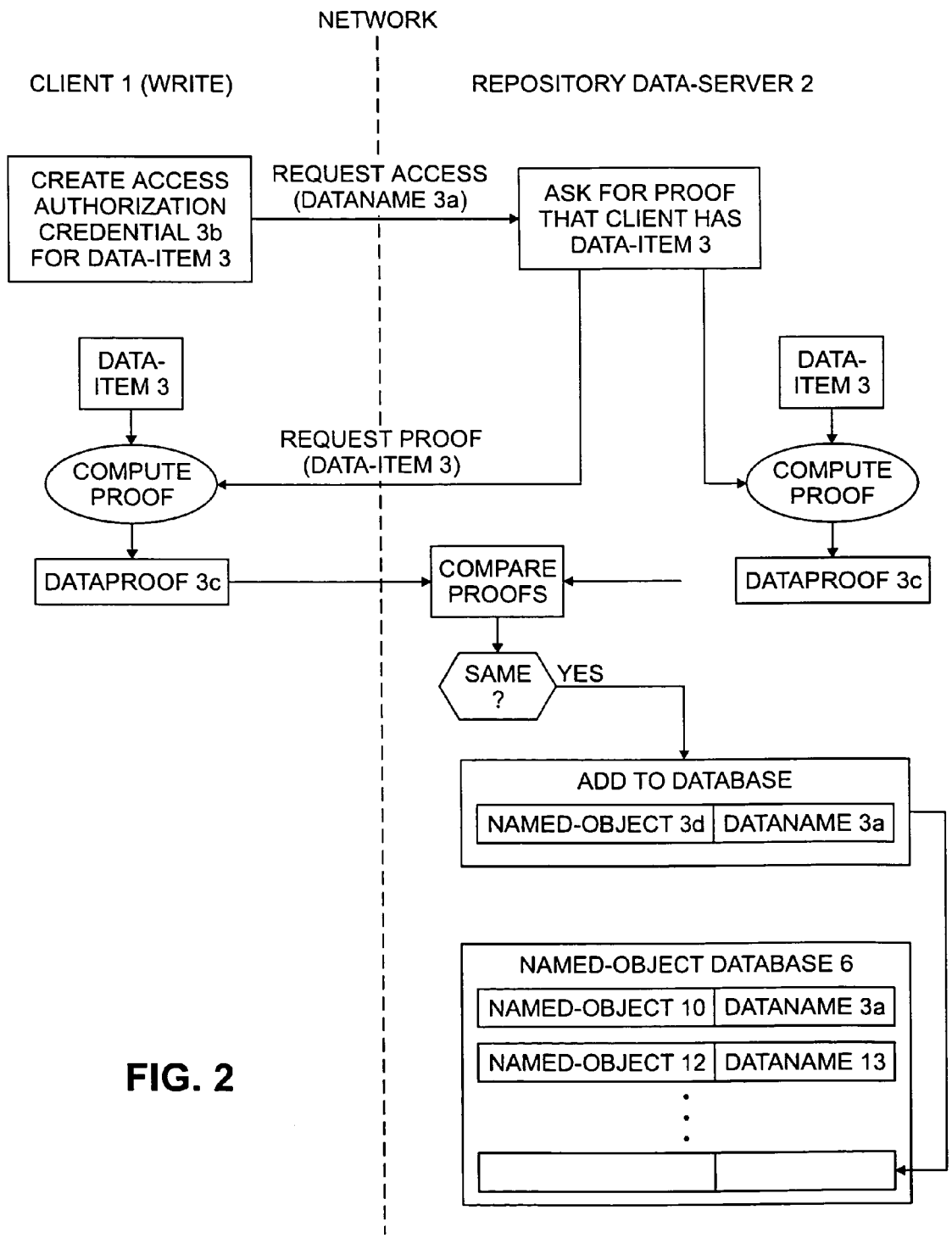
FIG. 2 is a block diagram depicting the creation of a named object to secure future read access to a data-item.

Although repository data-items are written directly, in the primary embodiment of this invention they can only be read indirectly, by referring to "named-objects" such as 10 and 12 in FIG. 2. This property is not shared by the scheme of Farber and Lachman mentioned in the background section. This restriction is imposed for several reasons. First of all, this provides a mechanism for associating a fixed name with changing data: reading the same named-object, different data-items are retrieved at different times. Secondly, this level of indirection is used to implement an access control mechanism for shared data: it is useful to control access to a named-object (e.g., file), rather than to a particular string of bits (i.e., data-item). By associating access-control information with named-objects, restrictions can be placed on which users are allowed to read particular named-objects in the repository. Finally, if the repository handles the creation and modification of the named-objects, then it can tell if a particular data-item is currently associated with any named-object: this makes it possible to identify unreferenced data-items and reuse their storage space.

For these reasons, the repository maintains a named-object database. After ensuring that a data-item 3 being transmitted resides in the repository, the client 1 communicates with the data-server 2 in order to associate the data-item 3 with a named-object 3d (FIG. 2). It is possible for the data-server 2 to require that the claim submit a "dataproof", i.e., verify that the client actually has a copy of the data-item 3 being transmitted (and not just a dataname provided by some outside agency) before granting repository read access by associating the data-item 3 with the named-object 3d. A read client 5 (FIG. 3) associated with client 1 can use the access-authorization credential 3b that was generated in the deposit transaction to subsequently read data-item 3 indirectly by reference to named-object 3d, but no client can directly read data-item 3. All clients which read using named objects (such as 3d and 10) that are associated with the same dataname 3a actually share access to a single repository data-item 3.

If the client 1 (FIG. 2) transmits the data-item 3 to the repository using the dataname 3a only, the data server 2 might, for example, randomly select a few data-bytes belonging to the data-item 3, and request that the client 1 send these to it as a dataproof 3*c* before associating the named-object 3*d* with the data-item 3, which will allow future read access. Alternatively, the data-server 2 might select a hash function, and ask the client 1 to send it the value of that function applied to the data-item 3 as the dataproof 3*c*. Such verification could be routinely performed, or might only be used in extraordinary circumstances, such as in connection with proprietary data-items for which the datanames have been unlawfully broadcast.

When verification of ownership is required, this could also be accomplished in an offline fashion—allowing the individual client to determine what it needs to prove for each data-item without directly communicating with the repository. With offline dataproofs, the dataproof 3*c* in FIG. 2 could have been precomputed offline long before the "create-access-credential" request is sent—the client would have the dataproof 3*c* ready and waiting when it is needed and wouldn't even need to wait for it to be requested.

To prevent access to datanames which have been anonymously broadcast, an offline dataproof should depend on both the client and the data-item. One way to arrange this is to have a different "challenge-randomizer" value associated with each client—known to both the client and the repository. The challenge for a given data-item 3 could then be derived in a deterministic fashion using the challenge-randomizer and the data-item itself. A simple way to do this would be to hash together the challenge-randomizer and the dataname 3*a* and use the result as the seed for a random number generator which selects a set of data-item bytes to be returned; or alternatively just compute a hash on the data-item 3 that depends on the challenge-randomizer. The latter approach has the property that the entire data-item 3 is needed to compute the result of the challenge 3*c*, and so one party being asked to compute a challenge result on behalf of another would have to be given the challenge-randomizer value. Depending on how this value was selected, this might identify the party trying to gain access, or give away some valuable secret of theirs.

Transmitting Read Access

A client desiring access to a particular named-object 3*d* transmits its request to a client 5 (FIG. 3) that already has access, and the latter client passes along the request (along with the requester's access control information) to the repository data-server 2. If the requester is to share an existing named-object 3*d* (so that if anyone changes which data-item or data-items are associated with it, the requester will see the change) then the requester is given access to the existing named-object 3*d*. This kind of "access" transaction is used, for example, to share files. If, instead, the requester is only being given access to the data-item 3 currently associated with the named-object 3*d* (and will not see any future changes in this named-object) then the data-server 2 will make a new named-object 10 for the requester, associated with the same data-item 3. This kind of "copy" transaction is used, for example, to pass data "by value" to a network-based compute server. In either case, the data-item 3 itself is not copied—only control information associated with the named-object 3*d* is replicated in order to communicate data access.

Access could alternatively be transmitted in an offline fashion, by transmitting the named-object access-authorization credential 3*b* that users require to access the data item 3 themselves (perhaps augmented with other authorization credentials). By including a user-identifying token as a necessary part of the access-authorization credential 3*b*, the unauthorized broadcasting of access to proprietary data can be discouraged. Thus to cause the repository to make a copy of a named object, a client would need to provide its own authorization information for creating a named-object, along with the access-authorization credentials needed for reading the named-object.

Data-items could also be transmitted directly from one repository user to another using the repository as a kind of data-item compression aid. If the data-source wishes to send a data-item 3 which has been deposited in the repository and to which it has read access, then it only needs to send enough information to the data-recipient to allow it to deposit the data-item 3. This consists of just the dataname 3*a*, along with whatever information 3*c* is needed to answer the verification challenge that the recipient must meet in order to deposit by dataname. This form of peer-to-peer copying can be discouraged or controlled by making the verification challenge involve the entire data-item (requiring the source to read the entire item before it can transmit access), and by making the information needed to answer the challenge reveal information about the recipient to the source.

Repository users can grant access to their data to whomever they please by giving them appropriate access authorization credentials and decryption keys. Third parties connected to the network can be granted the access needed to act on behalf of repository users, providing useful applications that manipulate repository data, and performing useful data management and data transformation functions. File systems, databases and other persistent object storage systems can be built by third parties, or by users themselves, on top of the repository named-object mechanism. For example, for maximum privacy client software can maintain its own file system directory data for files kept in the repository, using ordinary encrypted data-items to hold the directory information. The repository itself is simply a secure data store, which avoids unnecessary redundancy in the transmission and storage of data, provides access control, and promises to keep verifiable copies of old data and never lose data.

File System Mirroring

The structure of the repository makes it feasible for a computer user with a low-bandwidth connection to the network to maintain a copy of a local file system in remote storage. This copy appears on the network as a "mirror" file system, which reflects the current state of the user's local file system.

The principal benefits of file system mirroring are data security and data accessibility. Once data is deposited in the repository, it is protected from accidental or malicious loss, and past versions of files are made accessible, certified and time-stamped. Moreover, repository file systems can be accessed at high bandwidth, and from anywhere on the network. Mirrored file system data can, for example, be processed by high-performance network based compute-servers, served as Web pages, retrieved through a Web-browser interface, or "mounted" and used as if it were on a local disk.

The benefits of mirroring a local file system provide justification for low-bandwidth users to keep substantial amounts of data in remote storage. The structure of the repository makes this prospect feasible for such users, by avoiding the need to deposit data which is replicated on more than one local file system. If the complete file system is not mirrored, the repository structure also makes it easier to identify which files should be omitted from the mirror: only unique data-items need to be transmitted to the repository, and so only unique data-items need to be considered for omission.

In addition to providing many benefits, file system mirroring also presents a potential threat to privacy. Users may be reluctant to place a copy of their most private files outside of their physical control. Conversely, the repository maintainers may be reluctant to accept the legal liability of having access to valuable secret files, and even to evidence of criminal activity. These kinds of problems are avoided if it is demonstrably impossible for the repository maintainers to understand any of the mirror data that is sent to them. This can be arranged by using encryption techniques, as is discussed in detail in the next section. Since the mirroring client only needs to write data and never needs to read data, as an additional safeguard the mirroring client can be given only the encryption keys needed to write data, but not those needed to read data. This protects users from having everything that was ever on their computer's disk visible to an antagonist who captures their computer. In order for users to be confident that appropriate encryption is being used and that no private information is being reported, the source code of the mirroring client software can be openly published. Open publication of mirroring clients also makes it easier for third parties to write their own clients which make use of the repository in novel ways.

Figure 4:
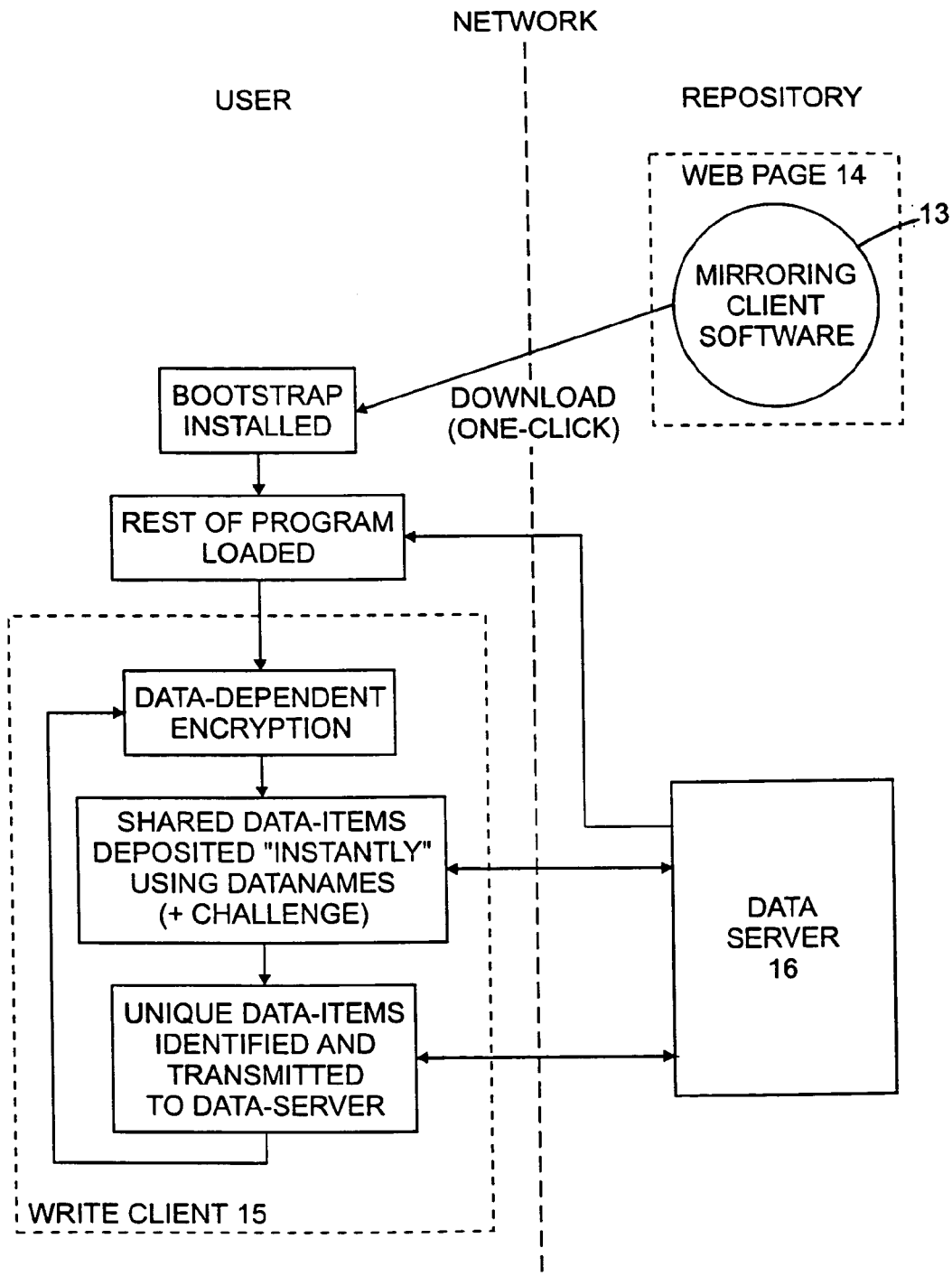
FIG. 4 depicts how a mirroring client can be downloaded and run on a user's computer with very little effort, time or user supervision.

Considerations related to setting up mirroring are depicted in FIG. 4. In addition to dealing with privacy issues through encryption, the mirroring software is also confronted with smaller barriers that might cause users to abandon mirroring, or not try it in the first place. This is important, since the perceived benefits of mirroring may not be enormous for the typical user; after all, most personal computer users don't currently perform any sort of backup on their data. The first barrier to running the mirroring software 13 is downloading it. This process can be made very short: since the client is designed to talk to repository servers (such as 16), only a minimal "bootstrap" program needs to be downloaded and installed initially, probably by clicking once on a Web page 14. This bootstrap program can download the rest of the client software later on.

Complex program configuration would also discourage use. By default, the client software can be configured on installation to simply mirror everything. Once installed, the function of the client program 15 is to run continuously, checking whether files have changed since they were last mirrored, checking if new file data is already present in the repository, depositing data-items as needed, and maintaining repository directory information. By default, this should all be done in an invisible fashion. While the processor is being heavily used for other tasks, this program should stop running. If other programs are using the network, their outgoing data packets should get priority. Running the mirroring client program should not perceptibly slow down the computer's performance on other tasks.

The perceived benefit of running the mirroring client can also be increased if it has system-health-enhancing properties. It can, for example, check for viruses as it examines the local file system. The client's virus information can be kept up-to-date as it communicates with the repository.

Privacy Through Encryption

Figure 5:
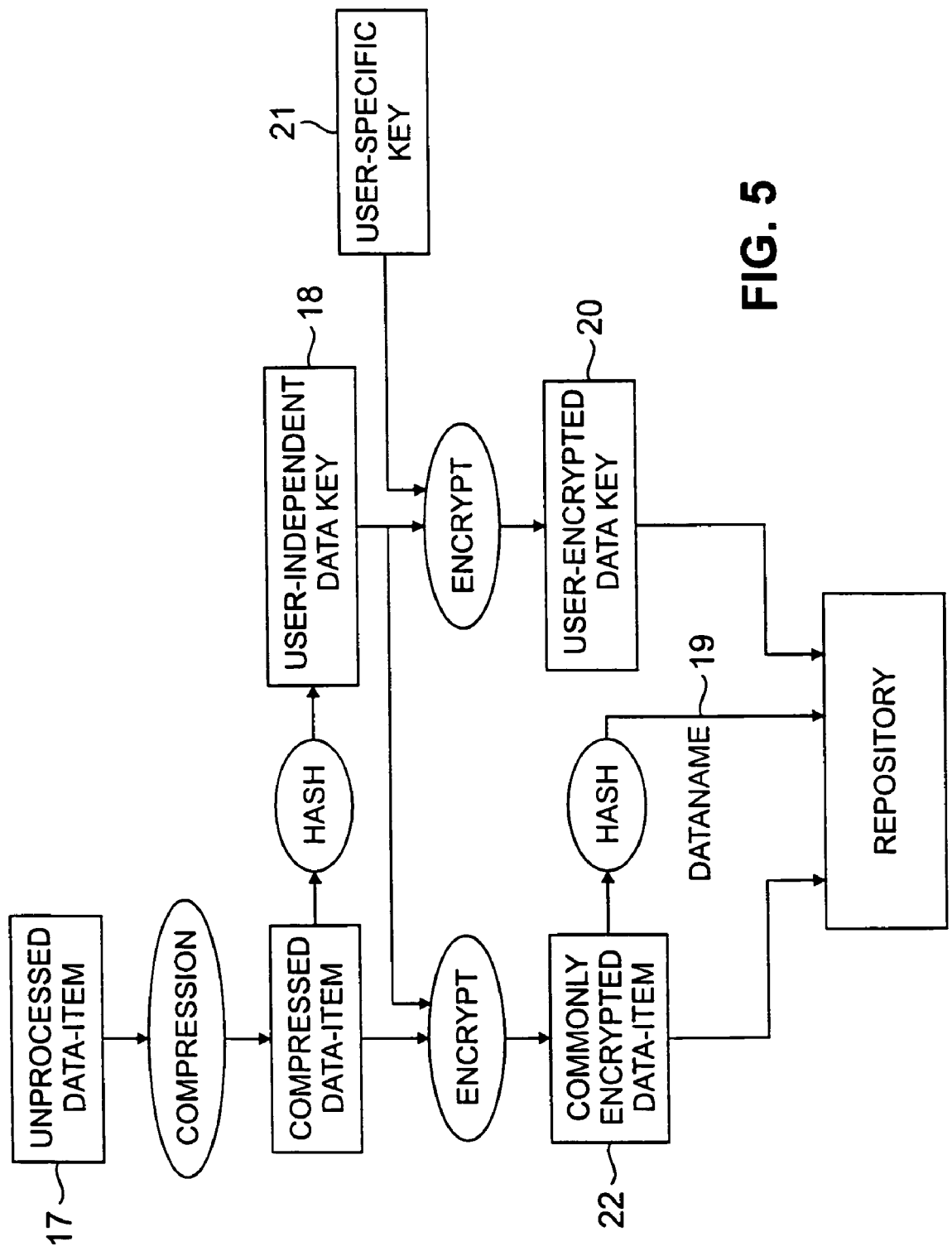
FIG. 5 depicts the data-item encryption process, which produces an encrypted data-item that is user-independent.

To avoid the need to transmit and store common data-items multiple times, all data-items are kept in a single shared data-pool in the repository, indexed by datanames, as discussed above. Without further elaboration, this arrangement has the drawback that sensitive private data is visible to the repository maintainers. To avoid this problem, files are ordinarily transmitted to the repository in encrypted form. For example, all mirrored file data is encrypted, as is indicated in FIG. 4. If the encryption was user-dependent, then each user's encrypted version of the same file would be different, and each user would have to transmit their distinct version of each file. In order to have all users with the same file produce the same encrypted data-item, all files are encrypted in a user-independent fashion: the encryption key for each file is derived from the file data alone. This is depicted in FIG. 5.

The procedure for file system mirroring is otherwise the same as discussed above. Each file 17 is compressed and encrypted before computing its dataname 19, which is used to determine whether or not the encrypted data-item 22 needs to be sent to the repository. The client software encrypts files using a datakey 18 that is derived by hashing the compressed file data. To maintain privacy, care is taken that the data repository never sees this datakey "in the clear." For compatibility with media such as audio and video data which are often used in a sequential or streaming fashion, both the compression and the encryption can be performed in a fashion which allows the data-item 22, when being read, to begin to be decrypted and decompressed before the entire data-item has been read.

When a client wishes to retrieve and decrypt a repository data-item, the datakey that was used to encrypt it is needed. For this reason, it is natural to include an encrypted copy of the datakey 20 as part of the named-object in the repository that is associated with this data-item. The encrypted datakey 20 belongs with the named-object rather than with the data-item because the encryption of the datakey will not be the same for all users—the key 21 used for this will vary from user to user. By making sure that a mirroring client doesn't have (or quickly loses) the ability to decrypt datakeys that it writes, write-only mirroring clients are enabled. This can be accomplished, for example, using public/private key pairs, with the mirroring client only holding the public keys.

Groups of users who wish to share a set of named-objects (for example, a file system) will also share an "aggregate-key" that is used to encrypt all the datakeys in that set of objects. Care is taken that the data repository never sees aggregate-keys in the clear. When access is transmitted by copying a named-object (rather than by sharing it), the transmitting user gives the unencrypted datakey directly to the access recipient.

Every repository client needs to provide an access-authorization credential in order to read a data-item associated with a named-object. This credential includes a repository-name or "handle" which uniquely identifies the named-object for that client. For the mirroring client, this handle can be derived by hashing the file system path-name on the client's local file system. In this case, it is sufficient for the client to remember all pathnames in it's directory tree in order to be able to reproduce the handles of all of its files. Thus, for example, part of the mirroring process might involve writing data-items which are directory listings for each subdirectory that has changed. Privacy is enhanced if handles are difficult to guess: this can be accomplished by having each mirroring client remember its own randomly chosen "name-randomizer" value which it uses as part of the hashing process that derives handles from file system pathnames. The hashing process might be, for example: start with the name-randomizer and the first component of the pathname, and hash these together; take the result of this hash and hash it with the next component of the pathname, and so on. This kind of hierarchical construction has the advantage that given the handle for some directory along with pathnames starting at that directory, all of the handles for that directory can be constructed. This may make it more convenient to transmit handle information from one client program to another.

While user-independent encryption provides privacy for data-items that are used by only one user, any shared data-item has a vulnerability: given access to the unencrypted file data for any client which shares the data-item, it is easy to discover which file contains the unencrypted data-item. The concern here is not that it will become possible to decrypt the data-item; the unencrypted version was assumed to be available. The conflict with privacy is that it becomes possible for the repository maintainers to identify shared programs and data that a user has in their file system. For example, the repository maintainers could compute the dataname of a particular version of the executable of Microsoft Word, and monitor all transactions to construct a list of all users who have deposited a copy of this program.

Virtual Private Storage Systems

In the scheme described thus far, the datakey used to encrypt the data-items is derived identically by all users from the unencrypted data-item alone. An alternative to this is to have an additional piece of information used to determine the data-item encryption key, which might be called a family key. All users with the same family key use the same method to derive the data-item encryption key from the data; users with different family keys use different methods. For example, a user might use the family key to modify the datakey described above before using it to encrypt the data, as in data-item encryption-key=$E$(family-key, datakey)

where E is itself an encryption operation. This has the advantage that it makes a family of data-items more private. For example, this would prevent the repository maintainers from monitoring whether users in this family have deposited specific known pieces of data, since without the family key the repository maintainers will be unable to generate the same data-items and datanames to compare against. This has the disadvantage, of course, that instances of data-items which would have been identical are now made different, and hence the storage and transmission of these data-items becomes less efficient.

Privacy Through Anonymity

If family keys are not used, or if family keys become known, it becomes possible for the repository maintainers to identify shared programs and data that a user has in their file system, which conflicts with user privacy.

This conflict can be avoided if all transactions with the repository are anonymous, so that it is impossible to tell who has access to a particular data-item. Of course, for users to be truly anonymous, all data communications would have to be forwarded through a third party "anonymizer" so that identifying information doesn't appear in the network data packets received by the repository. Anonymous transactions that the repository wishes to charge money for can be handled using electronic cash techniques (see D. Chaum, A. Fiat, and M. Naor, "Untraceable Electronic Cash," Advances in Cryptology CRYPTO '88, Springer-Verlag, pp. 319-327). Alternatively, funds can simply be transferred between non-anonymous and anonymous repository accounts using blind signatures.

Anonymity can, however, be a liability. This is the case in connection with named-objects that are shared by many users. These objects can be shared either by separately granting access to each sharer, or by a number of users all sharing the same access information (or even the same identity). In either case, the prospect of users using the repository to illegally share proprietary data (music, videos, programs, etc.) causes a potential problem for the repository maintainers. A completely anonymous repository is much more attractive for these kinds of activities than a more conventional data repository. It may be advisable, for this reason, to limit anonymity in some manner.

Limiting Anonymity

One approach is to eliminate anonymity altogether. Users simply trust the repository to not accumulate or reveal information about the non-unique data that they have in their file systems. In this case, the less information the repository accumulates, the less it can be coerced into revealing. If the repository avoids storing enough information to link users and data-items, then users have a kind of effective anonymity. Extra information provided only at the moment of access can allow users and data to be linked. At that moment, ownership data associated with a named-object can be generated using a cryptographic hash function in a manner that prevents ownership from being discovered, but allows ownership to be proven.

Figure 3:
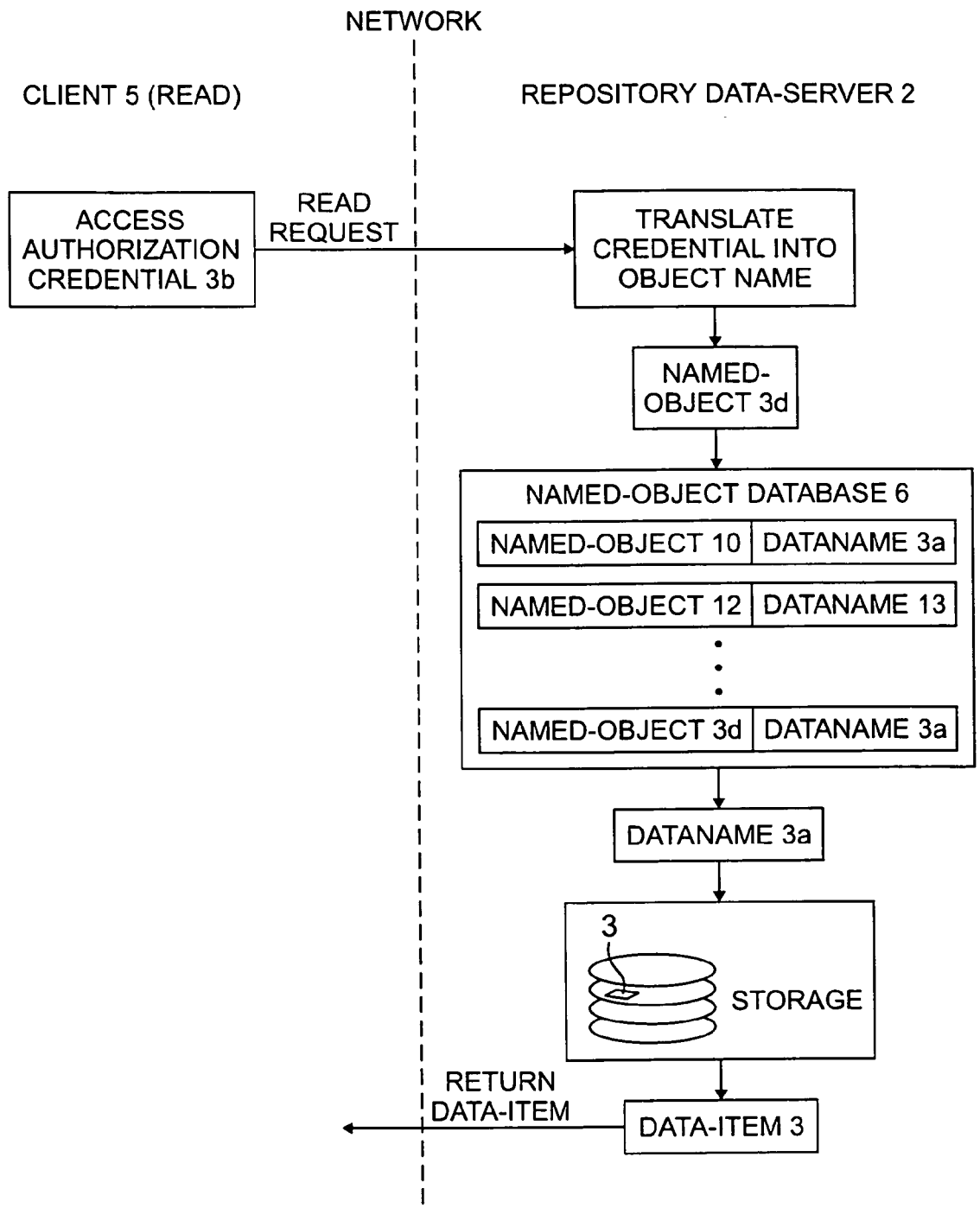
FIG. 3 is a block diagram depicting a read operation using a named object.
Figure 6:
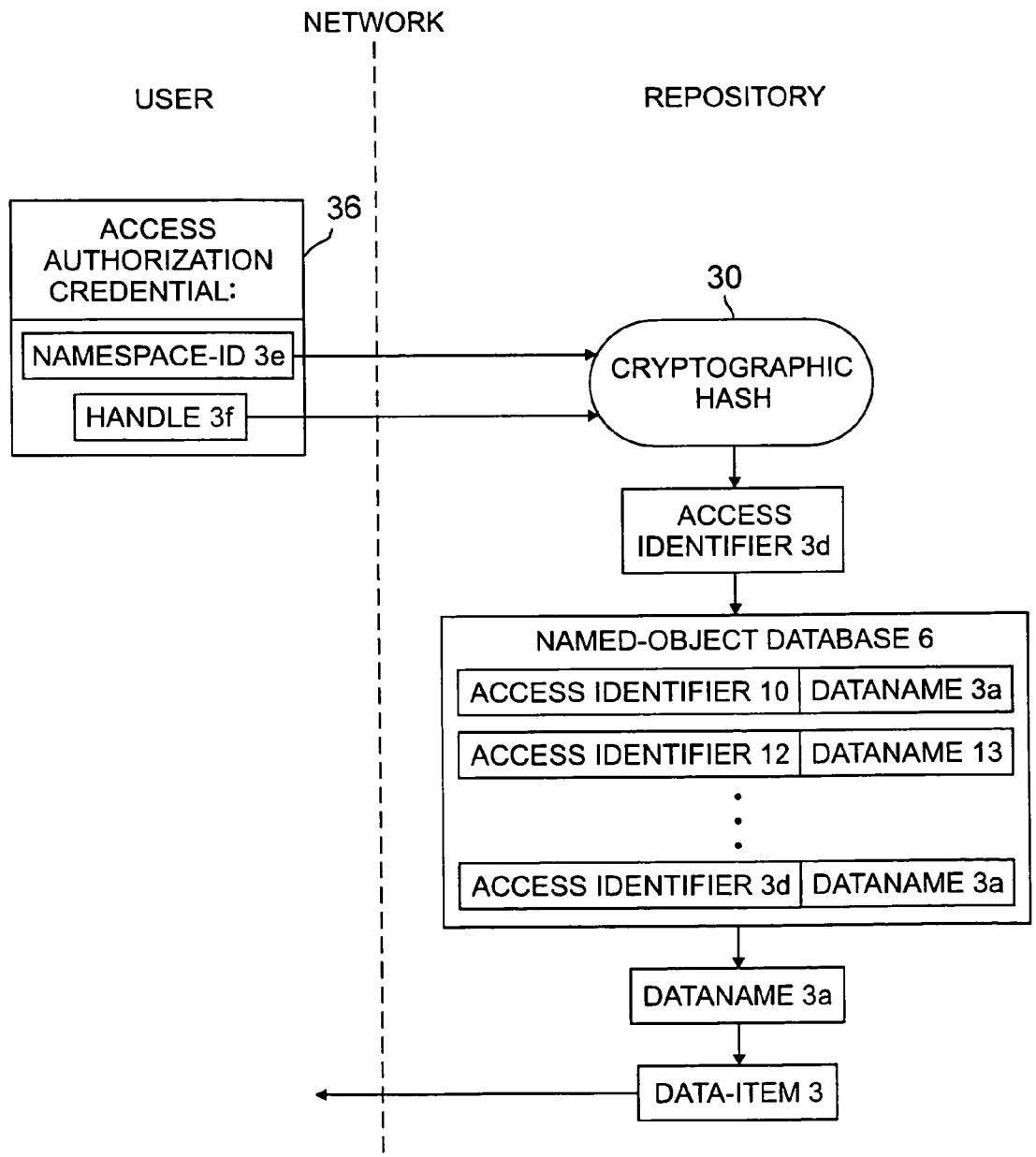
FIG. 6 depicts a way to allow a user to prove ownership of a named-object, without requiring the repository to hold information from which it can identify the user.

This is illustrated in FIG. 6, which contains some details omitted from FIG. 3. In this example, we're assuming that the access-authorization credential 3b for a named-object includes a user-identifying token called a "namespace-ID" 3e. A namespace is simply a group of related credentials belonging to a single user. The access-authorization credential 3b also includes a repository handle 3f, which is unguessable by construction. Read access to a named-object may be transmitted from one user to another without the intervention of the repository (i.e., in an offline manner) by transmitting the access-authorization credential 3b. Control over who has the authority to create or use credentials for a given namespace can be handled separately, or can be encoded in additional credentials.

Regardless of the precise composition of the access-authorization credential, anonymous ownership data can be generated from it by hashing the namespace-ID 3e and the handle 3f together using a cryptographic hash function 30. The resulting access identifier 3d is used to identify a named object in the named object database 6. We equate this identifier with the named object itself (cf. FIG. 3). The existence of a named object in the database 6 corresponding to the access identifier 3d proves ownership: this database entry was generated when the data-item 3 was associated with the named object 3d (FIG. 2). Because of the one-way nature of the cryptographic hash, and because the unguessable handles are never stored in the repository, it is impossible to invert the hash 30 and determine the namespace-ID 3e from the repository's stored access identifier 3d. Since the repository uses the access identifier 3d to determine the data-item 3 that is associated with the named-object, the impossibility of inverting the hash also hides the connection between data-item 3 and the access-owners (i.e., the users or client programs which have established access-authorization credentials) who are able to read it.

Partial Anonymity

Another approach is to treat shared named-objects differently than unshared ones. If these two categories can in fact be distinguished, then unshared objects can be made completely anonymous, while shared objects have no anonymity: all transactions involving shared named-objects require user identity verification. This leaves the repository in the same position as more conventional repositories with respect to intellectual property issues associated with shared files, and in a better position with respect to the privacy of unshared files.

This approach assumes that it is possible to distinguish between shared named-objects and unshared ones. This will in fact be possible if the sharing of access-information can be prevented, so that all sharing is done through explicit "share" requests to the data-server. In particular, in this approach we wouldn't provide an offline method of transmitting access-information without sharing a user-identity. Sharing access-information can be discouraged by holding those who share such information responsible for whatever use is subsequently made of the shared named-object. It can also be arranged for the sharing of access-information to reveal the true identity of the access owner to all sharers (but not to the repository). To permit access sharers to know who the access owner is—without this information being visible to the repository—access owners can be compelled to store their certified identity information in the repository in an encrypted form which only they and the sharers can read. They can be required to prove that they've done this using a zero-knowledge protocol (for a discussion of zero-knowledge protocols, see U. Feige, A. Fiat and A. Shamir, "Zero-knowledge proofs of identity," Journal of Cryptography, 1: 66-94, 1988). If user authentication requires knowledge of the key used to encrypt the identity information, then all users sharing access information will have it.

By limiting anonymity in other ways, it may be possible to put the repository in a still better position. For example, those who are sharing a set of named-objects could be given access to information about who last modified each object, with this information kept invisible to the repository. The identifying information provided could, for example, be a repository email address, with associated personal information revealed by the repository only under a court order. This organization would allow users to confront each other privately concerning controversial sharing of data before trying to compel the repository to intervene.

Poorly Verified Users

Finally, it should be noted that it may be desirable to support some users who are effectively anonymous not because the repository forgets information about them, but because the repository cannot confirm their identities. For example, it may be desirable not to require users trying out the mirroring client to provide any sort of verification of their identities. In this case, it would still be necessary to prevent such users from using their unverified repository accounts to broadcast proprietary data. This can be accomplished by not allowing repository-mediated sharing of data-items that come from unverified accounts, and by not allowing offline transmission of read access to data-items in such accounts. The total aggregate bandwidth available using the data-access privileges of such an account could also be limited, so that sharing of access information doesn't enable more than a small number of users to simultaneously read data from this account at a useful rate.

Composite Objects

There are several reasons to construct named-objects which are composed out of more than one data-item. For example, a mirroring client running over a telephone modem may take hours to deposit a single very large file which is not already in the repository. If this file is broken up into many smaller pieces, then if the telephone connection to the local ISP is lost before completion of the full transfer, all of the pieces which were successfully transferred will not need to be transferred again. If the connection is regained and the transfer attempt is repeated, the normal repository query protocol will discover which pieces have already been deposited, and they will not need to be sent again.

Similarly, some structured items can be sent more efficiently if they are broken up appropriately. For example, email messages with multiple attachments can be transmitted (and stored) more efficiently if they are split up into several pieces, with the divisions occurring at appropriate attachment boundaries. In general, files with a limited amount of user-specific information can segregate this user-specific information into designated segments, allowing the file to be broken up in such a manner that most segments are common between multiple users. For example, a user-name could be assigned to a variable at the beginning of a file, and the name would not need to appear explicitly again.

Finally, for general use of the repository as a network-attached file system, the division of files into smaller blocks is useful.

To support composite structure, it would be expensive in terms of resource usage for the repository to associate with each client a separate copy of the structure information for every file deposited. For a long video file, for example, the repository might store hundreds of thousands of individual data-items corresponding to individual frames of the video, with a corresponding list of datanames repeated for each client which deposits this object. For this reason, it is logical for lists of datanames which describe larger objects (with perhaps other information included) to themselves be deposited as data-items in the repository. These index-items can then be shared, just as any other data-items.

Figure 7:
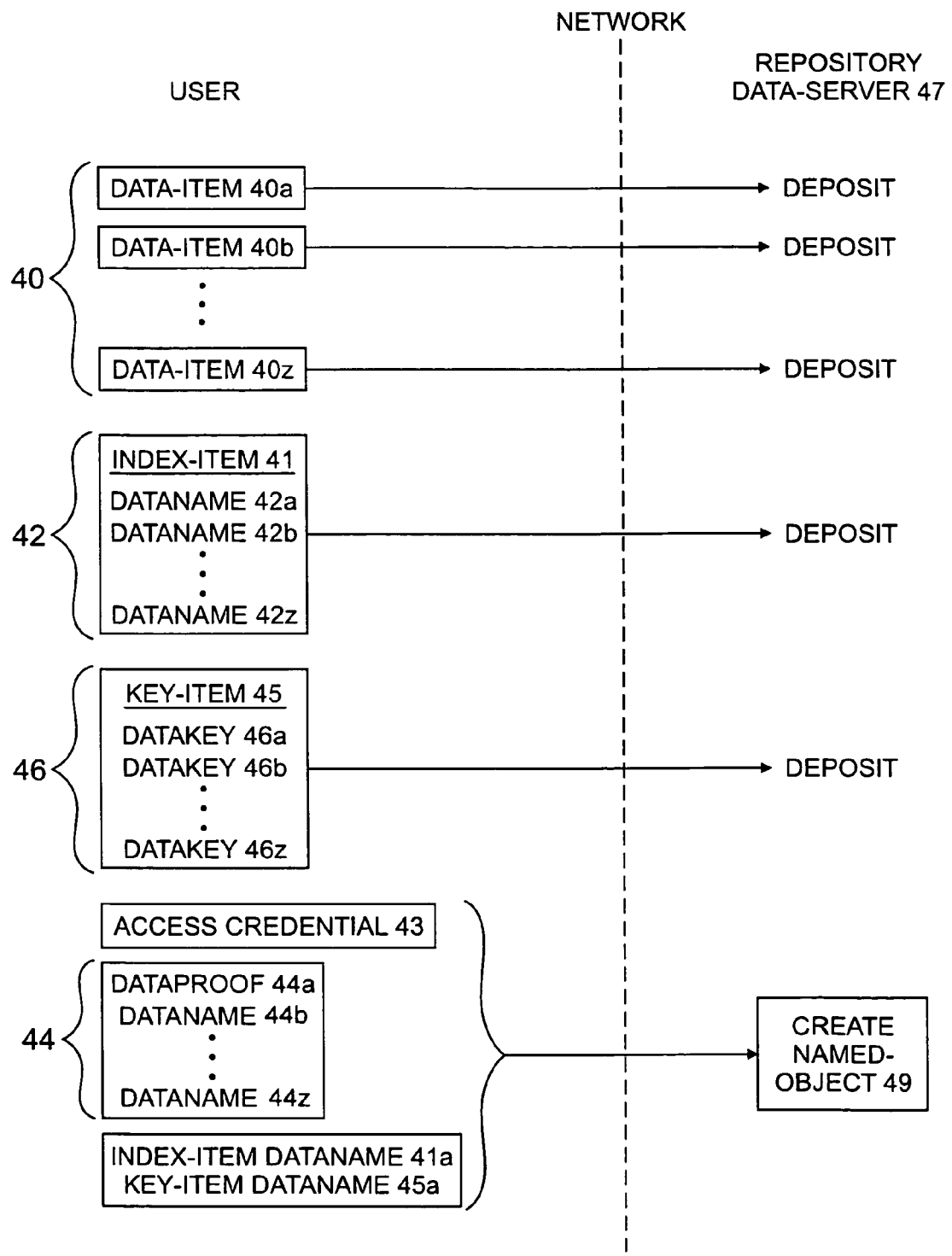
FIG. 7 illustrates the steps involved in depositing a composite-item and associating it with a named-object.

The steps involved in depositing a composite object using an index-item are illustrated in FIG. 7. First the individual data-items 40 are deposited into the repository as described earlier, sending data to the repository data-server 47 only when the data-item is not already present. Then the ordered list of corresponding datanames 42 is deposited as a data-item 41, called an index-item. Assuming the data-items 40 are encrypted, a list of unencrypted datakeys 46 (in the same order as the datanames 42) is deposited as a data-item 45, called a key-item. Finally, the dataname 41a of the index-item 41 and the dataname 45a of the key-item 45 are associated with a named object 49 in the repository. This involves sending an access authorization credential 43 and (assuming verification is required) a list of dataproofs 44, one for each of the data-items 40. Alternatively, it may be more efficient for the server 47 to return a token at deposit time confirming each deposit of the data-items 40, and use these tokens for ownership verification instead of the list of dataproofs 44: this reduces the amount of work that the server 47 has to do at the moment when the named-object is created. Both the index-item 41 and the key-item 45 are encrypted in a user-independent manner, just as any other data-items. The datakey for the key-item 45 becomes the datakey for the entire composite data-item, and is encrypted privately before being stored in the repository, as discussed earlier. The repository is given access to the datakey for the index-item 41 only transiently, when it needs to look at the index-item.

Figure 8:
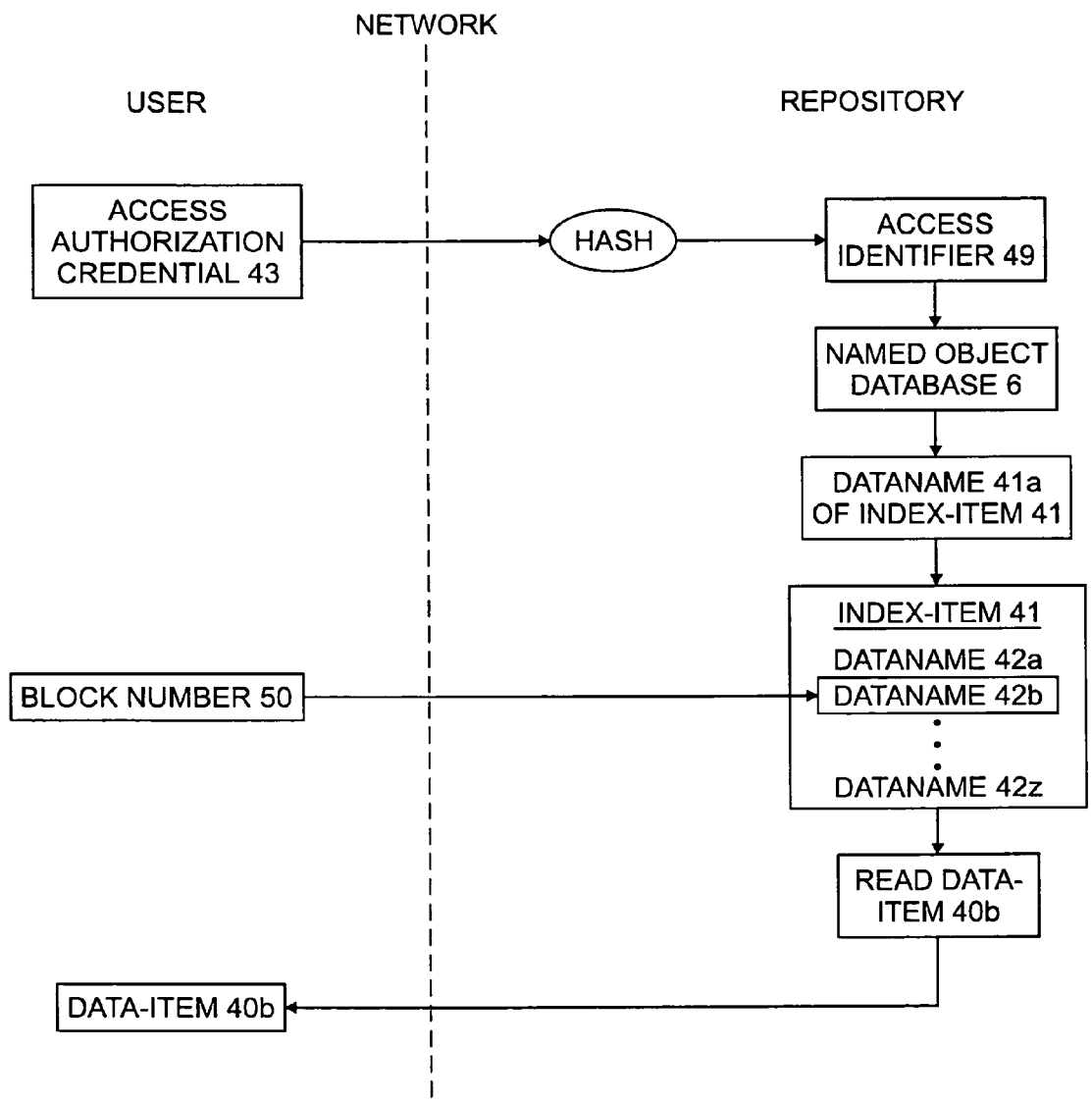
FIG. 8 illustrates the steps involved in reading a portion of a composite-item.

The process of reading part of a composite object is illustrated in FIG. 8. In addition to the read-access authorization credential 43 for the named-object 49, a block number 50 is also supplied. This indicates which dataname (e.g., 42b) in the index-item 41 should be referenced. The corresponding data-item 40b is returned to the user. Note that this scheme preserves the atomic-nature of named-object writes: the current data-item that a named-object accesses is changed in a single operation.

Historical Versions of Objects

For mirroring of personal computer file systems over low-bandwidth and intermittent network connections, there is little need to ever erase any data-items from the repository. For repository users with faster connections, however, it would be unreasonable to try to keep every version of every file. As an extreme example, if a file is rewritten every time a byte is added, by the time the file reaches a Megabyte a total of about half a Terabyte of data will have been written. Keeping all versions of such a file should be avoided, if possible.

Figure 9:
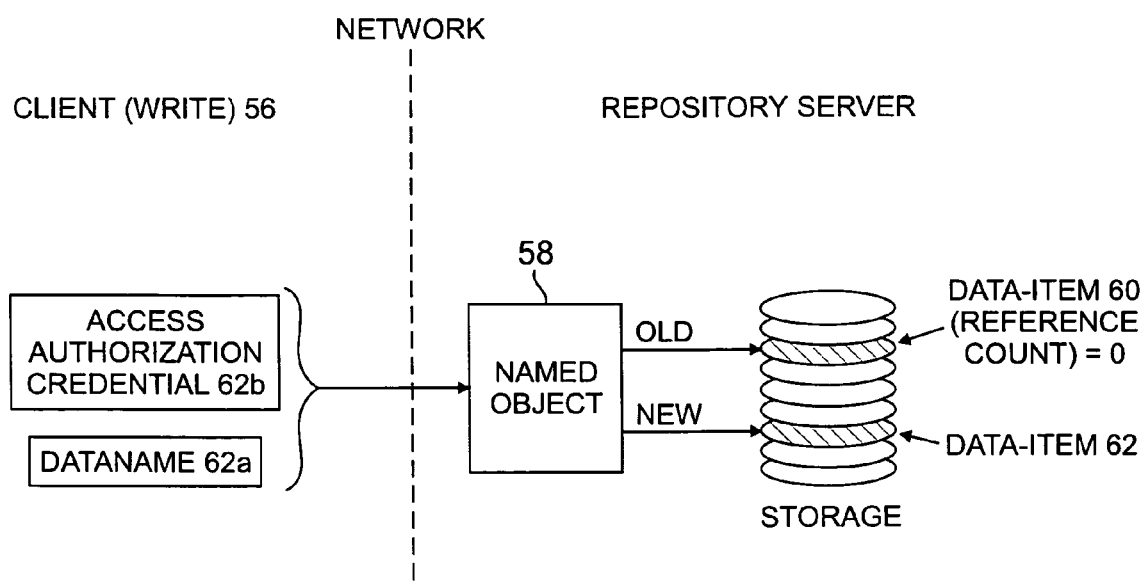
FIG. 9 is a block diagram depicting a user's request that the repository modify a named object to point to new data in the storage.

In a repository which keeps historical versions of named objects, a choice must be made of which data to keep. This issue can be addressed by using repository snapshots and named-object reference counting. A "snapshot" of a file system which has been implemented within the repository is a complete "backup" copy of all directory data and file data at a particular moment in time. Snapshots are relatively inexpensive to make, since no data-items are ever duplicated in the repository. To copy a set of named-objects, only pointer and property information actually needs to be copied. By periodically taking "snapshots" of all named-objects in the repository, the ability is preserved to retrieve previous versions of the state of all objects at particular times, but not at all times. Data-items which aren't associated with any named-object are not needed in any of these snapshot versions of the files kept in the repository. This is illustrated in FIG. 9. When write client 56 associates a new data-item 62 with named object 58, the reference count of the previous data-item 60 associated with named object 58 may go to zero. This means that data-item 60 is unreferenced, and it may be deleted and its storage reclaimed. If data-item 60 was part of any file system snapshot, its reference count would not have gone to zero, and so it would be preserved. Thus keeping count of all references by named-objects to data-items allows an unreferenced data-item such as 60 to be erased without any danger of losing the ability to retrieve snapshotted earlier versions of all files.

Since data-items which are common to more than one snapshot are only stored once, this backup scheme can be classified as "incremental." Doubling the interval between snapshots only makes it possible to reclaim space associated with files that changed during each of two consecutive original intervals. Beyond some correlation time, it is expected that the set of files that change during each interval will be substantially different for each interval, and so little is saved by further increasing the interval. For this reason, shorter-interval snapshots are kept for a finite period, and longest-interval snapshots forever. When the named-objects associated with a short-interval snapshot are erased, storage space occupied by data-items that become unreferenced can be reclaimed.

File system snapshots can be implemented by declaring a moment of time to be the snapshot, and all writes after that moment don't overwrite previous versions of the same file— the incremental backup is accumulated incrementally. Each snapshot declares that all named objects that make up the file system start a new version the next time they are written, and the old version is preserved.

As long as the capacity of storage devices continues to grow exponentially, there is (for most users) little need to ever move any old data out of the repository, onto archival media. For example, if the longest interval snapshots are taken every month, and half of the monthly change in a typical user's unique data is the addition of new files, and their unique-data disk usage grows at the same rate as the hardware capacity of disks, then keeping all monthly snapshots in the repository forever only increases the total disk usage by about a factor of two. If unique user data doesn't grow exponentially, then total disk usage also grows more slowly than hardware capacity, although old data becomes a more significant portion of total usage.

A limiting case of the snapshot method is to set the time interval between snapshots to zero. This means that every time a named object is rewritten, a new version is created. Every version of every object is kept. If this results in too many versions of some named objects, then a decision is made to declare some of these versions as being unnecessary, and to delete them. Rather than simply prune versions as they are written based on a global time threshold (the snapshot method), versions may be pruned based on many criteria. Decisions on which versions to delete might depend on separate policy information associated with each object, the relative time intervals between different versions of the same object, and even on global time thresholds.

The data-pruning mechanisms discussed imply a distinction between short-term memory and long-term memory in the repository. This distinction reflects the fact that objects that have changed recently are the ones most likely to change again. Thus in the short-term, data-items are kept in a form that it is convenient (or at least possible) to erase. In the long-term, it may be inconvenient (or even impossible) to forget any data-items.

Forgetting the Meaning

The repository is designed to be able to remember historical versions of file data forever. This can be accomplished using standard techniques such as redundancy and archival media. Files which have been removed from the current version of a repository file system can be restored by copying them from an earlier version. Historical versions of files which have changed remain available. Hash information about each file system is digitally timestamped, to allow the repository to provide legal evidence of the existence and contents of files at specific times in the past (see Timestamping discussion below).

The indelible character of the repository means that it may be difficult or impossible to destroy all traces of old data even if someone badly wants to. The general use of encryption makes it possible, however, to render selected old data meaningless. The basic idea is that the most essential encryption keys are never stored in the data repository, and so the user is free to forget these keys, making all associated data unintelligible. If data that is to be retained is copied before "forgetting" the rest in this manner, then information can be selectively erased: only a now-meaningless encrypted copy of the forgotten data remains in the repository.

If keys have been shared (more than one person knows them), then past data can be forgotten in this manner only if everyone who knows these keys cooperates. One can always, however, stop sharing future versions of files by simply copying them to a new client file system and no longer using the old client file system. This is really all that can be accomplished with certainty, since once data has been shared one is never certain that someone hasn't secretly made a copy of the data.

Other Access-Authorization Credentials

An access-authorization credential is a credential that may be presented by a client program to a repository server in order to prove that it has authorization to read a data-item. In the embodiment described above, an example of such a credential has been provided (FIG. 6):

access-authorization-credential $3b$=(namespace-ID $3e$, handle $3f$)

where the namespace-ID $3e$ identifies the access-owner, and the handle $3f$ identifies a named-object $3d$ belonging to that namespace. A client program attempting to use this credential $3b$ must demonstrate that it is one of the authorized users of the namespace-ID $3e$. The existence of a named object $3d$ in the repository corresponding to the credential $3b$ records the right of an authorized client to access the corresponding data-item 3.

This example illustrates the general character of an access-authorization credential: it constitutes proof that access has been authorized, and it includes information identifying the access credential's owner. The latter property is really only needed in a credential which can be used by third parties—this property then helps prevent anonymous broadcast of access capability. For credentials usable by third parties, control is maintained over who is permitted to create or use credentials for a given namespace-ID.

There may be advantages in having access-authorization credentials which allow direct access to a data-item, without reference to a named object in the repository. This is particularly appealing in connection with objects which have stopped changing. For such static objects, information about the association of data-items with names can be conveniently stored in ordinary data-items, thus reducing the size of specialized named-object databases. The metadata for these named objects would be managed by clients, and would not be directly visible to the repository.

An example of a direct-access credential might simply be the information needed to create an access-authorization credential for a named-object in the repository. In the above example, this would be (see FIGS. 2 and 6), direct-access-credential=(namespace-ID 3$e$, dataname 3$a$, dataproof 3$c$)

To use this direct-access credential, one could simply create a named-object in the repository at the moment when read access is required (including submission of the dataproof, as shown in FIG. 2 and earlier discussed), then read using the associated credential, and then delete the repository named-object.

For this mechanism to work, one would need to have a way to ensure that the data-item 3 is not deleted from the repository. In the discussion of historical versions of objects, we assumed that data-items which are not referenced by any repository named-object can be deleted, and their storage space reused. This deletion mechanism can be easily modified to accommodate direct access credentials. For example, when client 1 deposits data-item 3 (FIG. 2), it could specify a minimum expiration period. If data-item 3 becomes unreferenced by repository named objects, it would not be deleted from the repository until after the latest expiration date specified in any deposit.

Rather than require the repository to create and delete a temporary named object, one could simply allow a direct-access credential to be used directly for reading a data-item. As part of the data-item deposit process, the repository could supply some authentication code or signature to augment the direct access credential, allowing it to be used without requiring the dataproof to always be checked. Retaining the dataproof as part of the direct access credential makes it possible to verify credentials if repository signing keys have been compromised, canceled or are otherwise unavailable.

It may be desirable to allow the repository to delete a data-item as soon as all access authorization credentials which reference it have been declared deleted. To allow this, one could associate a reference counting scheme with the direct access credential. This could be done, for example, by associating a per-depositor record with each data-item whenever a direct access credential is created. When the credential is later declared deleted, the corresponding per-depositor record would be deleted. Since large reference counts are unlikely to ever go to zero, it may be that once the number of depositor records passes some threshold, the data-item can simply be marked as permanent. This would bound the number of per-depositor records associated with each data-item.

Note that even if the challenge set by the repository server as part of the deposit process is nondeterministic, it can still be the case that a dataproof or other deposit-proof information returned by the server in response to the deposit is perfectly deterministic and suitable for use in a direct-access credential.

Finally, note that the direct access credential could be the primary access authorization credential—it is not dependent on the existence of a repository based object credential.

Timestamping

Figure 10:
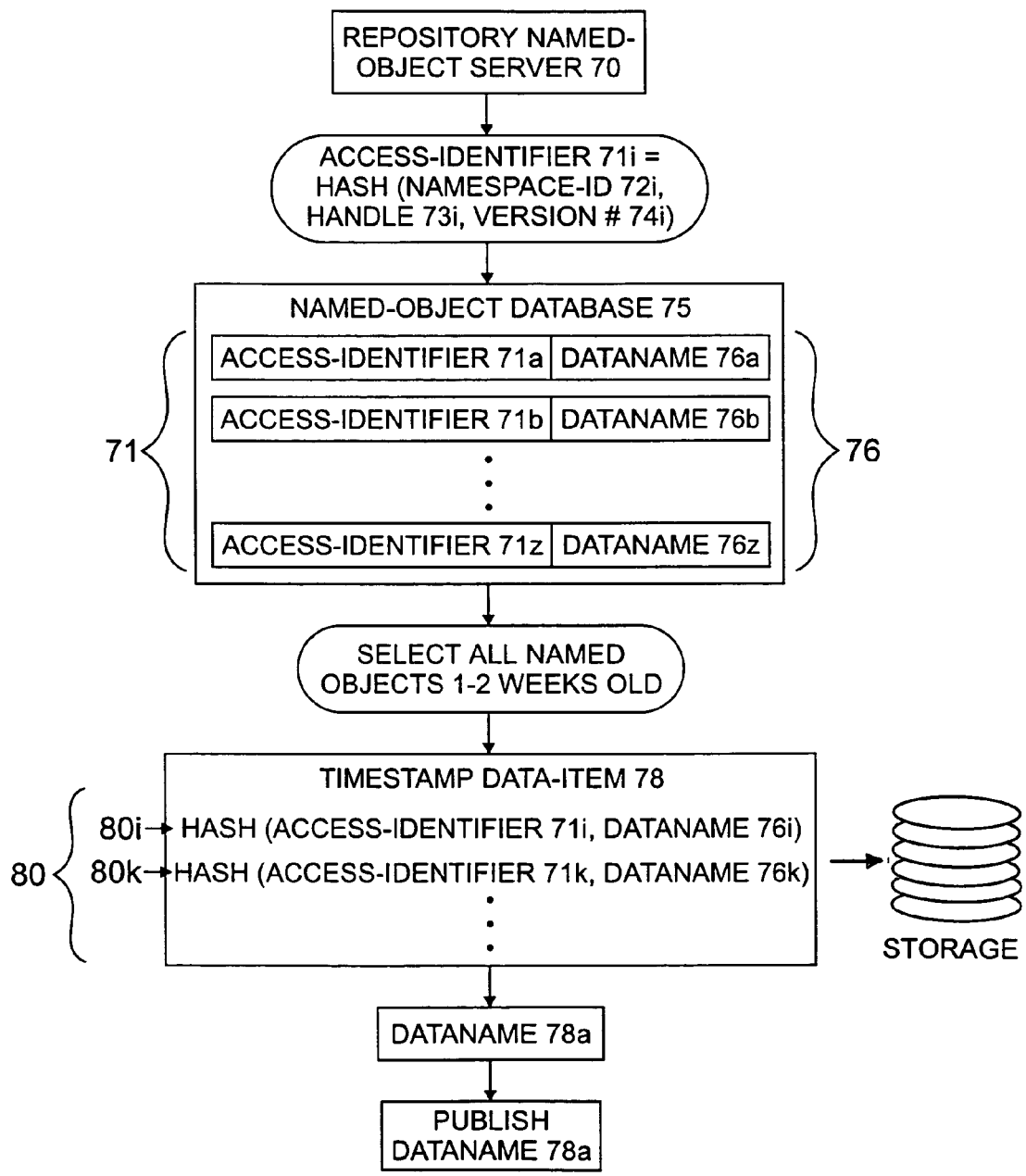
FIG. 10 is a block diagram depicting an embodiment of the repository's timestamping service.

FIG. 10 illustrates one possible scheme for timestamping repository named-object data. This scheme has the useful feature that all historical data is automatically timestamped: the repository can prove the ownership and contents of any version of a named object that has not been deleted. Users are not required to save any extra information in order to support this service. Short-lived versions of named objects are not timestamped.

Each named object is assumed to exist in multiple historical versions. In this case, the access authorization credential for a named object includes not only the namespace-ID 72$i$ and handle 73$i$, but also a version number 74$i$, which we'll assume is chosen randomly. As usual, the hash of the access authorization credential is the access identifier 71$i$ used to index the named object database 75.

In this example scheme, the repository timestamps all named-objects which pass a certain transience threshold, allowing proofs to be constructed for any timestamped object of when the named-object existed, what data-item it was associated with at that time, and who had access to it. This scheme also makes it possible to automatically lose the ability to construct proofs for objects which have been deleted from the named-object database 75.

In this illustrative scheme, we assume that the set of all named objects is divided up among a set of repository servers, each of which has authoritative information about a subset of the named objects (this division can conveniently be based on the access identifier). We will describe the timestamping procedure for a single repository server 70—the procedure for multiple servers is simply to timestamp each server separately. When a proof is needed, the server responsible for the required portion of the named-object space is identified, and it's timestamp information is used.

The access identifier 71 indexes the named object version information stored in a named-object database 75, which includes the dataname 76. We select a subset of the server 70's named object database 75 to be timestamped: for example, all versions which were created more than one week earlier, but less than two. This selects a subset which is not so recent that many of the versions will be deleted as being unneeded. If, in this example, we only perform timestamps once per week, then it makes sense to only timestamp one week's worth of versions at a time. By timestamping a selected subset of versions at once, it becomes possible to organize the timestamp information in a convenient form.

The actual timestamp record 78 consists of a list of cryptographic hashes 80, one per version selected for timestamping. Each hash includes an access identifier 71$i$ for a version of an object as well as a dataname 76$i$ associated with the version. This entire list is saved in the repository as a composite data-item 78, to be used in the future in constructing named-object existence proofs. The corresponding dataname 78$a$ is published publicly, or sent to a digital timestamping service.

Assume for simplicity that the timestamp list 80 is sorted by hash value. If a proof of existence is ever required for a particular version of an object which is still in the repository, its timestamp hash can easily be located within the timestamp data-item 78 for the relevant repository server 70. The datablock containing the relevant hash, along with the indexblock for the entire data-item 78 and the published dataname 78a for the index block, provide all the information needed to prove the time of the relevant hash. (More levels of hierarchical hashing could be used to reduce the size of an existence proof.) The timestamp hash for the particular version of a named object in turn allows proof of the ownership and dataname of the version. The dataname then allows data contents to be proven.

If a user deletes an object record such as the one indexed by 71i from the repository metadata, the corresponding timestamp hash 80i can no longer be used to prove anything. This is because of the inclusion of the random version number 74i in constructing the hash, assuming that all record of this number is erased along with the object record 71i. This is an important privacy feature, since timestamps could potentially be used by an adversary to prove that a particular user had access to a particular data-item, if the dataname 76i and handle 73i and version number 74i could all be reconstructed.

Note that if a direct access-authorization credential is supported, separate provisions would have to be made to have its hash included in the timestamping process. For the reasons discussed above, it would be important to include an unguessable component in this hash. It would be the client's responsibility to maintain a copy of any direct access credential that it may want to later prove.

Deposit Receipts

Deposit receipts play a similar role to time-stamps. Users can ask for and receive immediate proof that a deposit was successful, and that a certain level of persistence has been guaranteed. The repository will not make this guarantee until it has taken steps to actually safeguard the data. The actual receipt could simply be a digitally signed set of access-authorization credentials.

A Uniqueness Oracle

In addition to avoiding unnecessary data transmission, there are other uses which can be made of the repository's status as an oracle which can determine whether or not a data-item is unique. A prosaic example would be to use the repository as a "spam" filter. If users are encouraged to keep their email messages in the repository, with the header information separate from the body of the message, then the repository allows users to detect whether or not an email message that they receive contains unique data. Users might reject non-unique messages as junk mail.

The repository can give information not only on the absolute uniqueness of a data-item, but also on it's relative uniqueness. This ability is based upon the reference counts that are maintained by the repository in order to allow the reclamation of space occupied by unreferenced data-items. These reference counts allow the construction, for example, of better spam filters which don't reject relatively uncommon messages. They also allow the repository to, for example, help find viruses by detecting unexpected levels of uniqueness. If a virus always affects an application in the same manner, then the resulting data-item can be tagged in the repository as virus-infected, and immediately identified when seen. If, on the other hand, a virus has a variable effect, then each virus-infected executable file will tend to be significantly less common than other files associated with the same application.

The ability of the repository to tag a shared data-item with information also opens up other possibilities. For example, the first depositor of a data-item might be presumed to hold the copyright (until otherwise demonstrated), and could tag the item with information about who to pay if others want to use this item. Software vendors could tag data-items corresponding to old versions of their software with information about newer versions. All sorts of reviews and annotations could be attached to data-items, both encrypted and unencrypted. Such services could also be operated by third-parties using databases indexed by datanames. Annotations could be hidden from the repository by encrypting them using the datakey from the data-item being tagged.

Online-information vendors (software, music, books, etc.) may be interested directly in the reference counts corresponding to their (and competitor's) data. These counts could, for example, be normalized by the reference counts of all versions of a particular operating system in order to give market penetration statistics for a software application. The time development of the reference counts gives information about rate of sales.

A Layered Business Structure

The repository has a layered structure which lends itself to being implemented as several separate businesses. First there is the physical storage layer, which keeps data in safe and rapidly accessible high-volume storage. Next there is the data-server layer, which manages data-item storage and access using datanames and named-objects, and is responsible for historical versioning and time-stamping. On top of the data-server are built file system and data-services layers, which will in turn have additional application services layers built on top of them. Each of these distinct layers can be implemented as separate businesses, with competition possible at each level.

The primary business that is the subject of this invention is the data-server layer. This business provides an interface which allows clients to share storage efficiently, and to avoid redundancy in data transmission. The data-server business can make use of existing network storage companies for physical storage during its startup phase, and such companies provide extra storage capacity that can be rapidly deployed in case of unanticipated demand. The data-server business could also make use of other companies and entities for physical storage in the long run—it is an independent business.

Separating the companies that build file systems and advanced data-services from the data-server business has significant advantages. First of all there is a separation of liability issues, since data-services companies may be given unencrypted access to data that they are expected to protect and hold proprietary or confidential. If a data-services company wishes to challenge what is allowed under copyright laws, for example, the data-server business is not responsible for this client's decisions about to whom it gives access to data. Furthermore, separating advanced data-services from the data-server business makes it possible for competing companies to all make use of the same repository. This both lowers the barriers to competition, and makes it more likely that the repository will be associated with successful data-services companies.

The file system mirroring service, which is designed to help promote the data-server business among low-bandwidth users, doesn't require any separate network fileservers: this service can be handled directly as part of the data-server business. The mirrored file systems can be maintained directly by the mirroring-client software using client-maintained directory structures that are stored in the repository along with the data. This arrangement provides maximum privacy for user data, since if the directory information is encrypted, not even the structure of the file hierarchy is visible to the repository. The data can be accessed over the network as if it were a local file system by using a device driver which communicates directly with the data-server.

In the long-run, a repository data-server business is expected to make money by charging to mediate transactions between data-storers, data-services providers, and (perhaps) data-storage providers. Charges would reflect resource usage. In the near-term, the mirroring client provides valuable services which can be directly charged for. It would also be possible to charge only for very specific value-added services, such as disaster recovery assistance using mirrored data.

Other Features

Some individuals and organizations may be unwilling to let any of their private data be stored outside of their direct control. Such entities can still make use of the repository to maintain a mirror and backup of their public data, while they manage their private data themselves. The determination of which data is private and which public can be made using the repository query mechanism: a data-item which is already present in the repository can be deemed public. Such an entity will never transmit more than the verification challenge for a data-item to the repository. If such an entity runs its own isolated version of the repository data-server to manage its private data, then it obtains the benefits of communication and storage reduction, while retaining the repository's privacy advantages relative to the data-server maintainers.

Since datanames are obtained using a cryptographic hash, they provide a natural source of pseudo-randomness to help divide the data-service work evenly among data-servers. For example, if a local data-server doesn't recognize a dataname, it can use a portion of the dataname to help it decide which other data-servers are responsible for having the definitive answer as to whether the repository holds the corresponding data-item. Similarly, access identifiers are pseudo-random, and this can be used to help split up repository named-object information evenly among data-servers.

A rapidly growing trend today is the use of computers and digital media to replace other kinds of media. For example, at current disk prices, a high-quality digital scan of a typical book (compressed) takes about $1 worth of disk space. A music CD takes a similar amount of disk space. An interesting business opportunity built on top of the data repository is to perform these media conversions for people, putting the result directly into the repository. Such a service is already provided by Mp3.com for music CD's, using a specialized CD repository. In the case of the envisioned business, when multiple users perform the same conversion, the repeaters are instantly given access to the data-item. This not only greatly speeds up the conversion for them, but it also avoids filling the repository with many slightly different versions of the same information. The major issue that needs to be resolved in this context is how to avoid infringing upon intellectual property rights. It has not yet been decided in court, for example, whether it is enough that the user demonstrate that they possess a copy of the item and represent that they own it, in order to give them access to a copy. It seems likely that it would be sufficient for a user to mail the physical item to the conversion business, which would destroy the original and give them digital access to an electronic version.

Although the file system mirroring discussion only considered copying file system data from a client with a slow connection to the repository, it might be useful to such users to also provide the capability of mirroring in the opposite direction. This would be particularly useful if users with slow connections are also permitted to control the transfer of data between network file systems at high bandwidth, including such services as downloading files, applying compute servers to their network data, and even using an instant media conversion service such as the one outlined above. Results of such operations could be deposited at high-bandwidth in a user's network file system within the repository, which is mirrored within the user's local file system. The downloaded files, computation results, etc., would all eventually appear on the user's local disk automatically, being transferred as a background task by the file system mirroring software. User-initiated background copying of data between local and remote file systems would also be supported.

A coalescing repository such as the one described herein is very well suited to capturing broadcast digital data. For example, if a digital video program (digital cable TV, HDTV, satellite, etc.) is broadcast to a large number of repository users, each user only needs to deposit a small fraction of the data (perhaps just one frame each) in order to transmit the entire program to the repository. For example, if users deposit one frame at a time, starting at about the same time, and with some randomization in the order in which they deposit frames, then the task of depositing the program is automatically partitioned between the users by the repository's query-before-transmit protocol. By greatly spreading out the time period over which a broadcast object is deposited, the degree of synchronicity needed between depositors in order to share the deposit burden is greatly reduced. (Some randomization in the order that each client chooses to deposit frames may also help divide up this task). Ideally the broadcast coalesces back into a single compound data-object in the repository. Because of single-frame errors this won't actually be the case, but most of the frames will coalesce. This kind of broadcast deposit is particularly attractive in conjunction with disk-based program time-shifting hardware, which records broadcasts for later viewing. If all programs recorded are subsequently deposited in the repository, then they remain accessible even after the copy on the recorder's disk has been erased to make room for new recordings. Essentially all programs ever recorded could remain accessible to the user.

Similarly, the Web can be viewed as a digital broadcast medium. Users could permanently cache all Web pages they have viewed in the repository. This could be done, for example, by configuring the user's Web Browser to request that Web pages pass through a repository proxy server before being passed on to the user. Instead of temporarily caching Web data, as a normal proxy server would, the repository proxy server would deposit a copy of the Web page into the repository. By using a proxy server, rather than having the user deposit the pages directly, we avoid having a new Web page travel both to and from the user. All pages ever viewed would remain available and searchable by the user. This would result in the repository accumulating a copy of all Web pages viewed by its users, which would be useful in constructing Web search engines. Users would have an incentive to use the repository proxy server, since it makes their history permanently available to them. If the repository is arranging for retrieved data to be cached for availability, then having their data in the repository is useful to content providers, since it can save them bandwidth (the repository can use standard techniques to check if it has the latest version of a URL).

Figure 11:
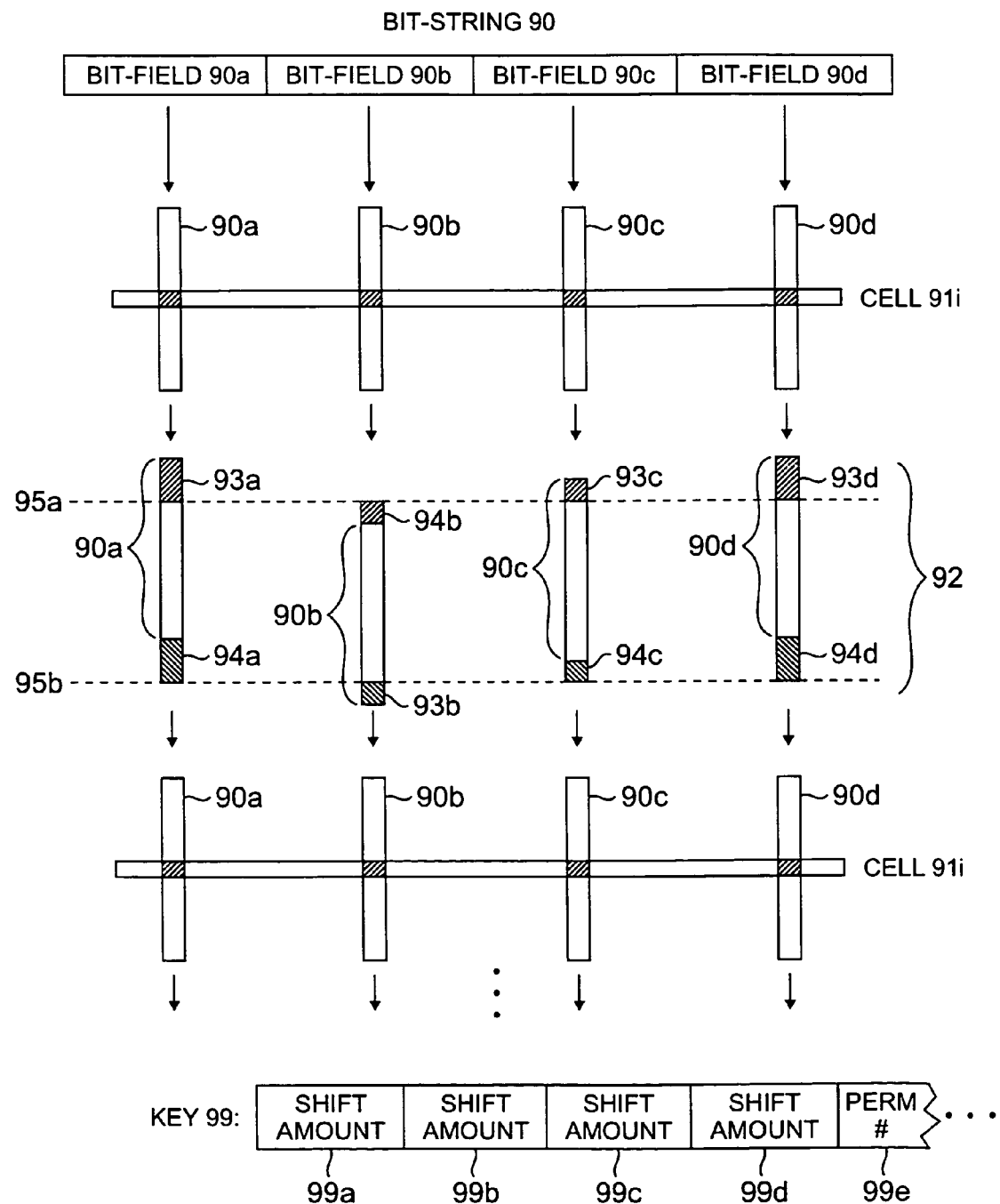
FIG. 11 is a block diagram depicting an encryption scheme based on a reversible cellular automaton.

A novel way of encrypting a data-item, suitable for use in the repository, is to use an encryption key to control a reversible cellular automata (RCA) dynamics. (For a discussion of RCA models, see N. Margolus, "Crystalline Computation," in the book Feynman and Computation, edited by A. Hey, Perseus Books 1999, pages 267-305). A CA-based scheme has the advantage that it can be run efficiently in software and can easily be accelerated in hardware, since the dynamics is local and uniform (see N. Margolus, "A mechanism for efficient data access and communication in parallel computations on an emulated spatial lattice," USPTO patent application, filed Aug. 12, 1999). This is illustrated in FIG. 11. In this example, the bit-string 90 to be encrypted can be taken to be the cell data for an n-dimensional CA space, with a plurality of bits associated with each cell. In the illustration, we divide the bit-string 90 into four pieces (90a, 90b, 90c and 90d) which we will call bit-fields. Each bit-field can be interpreted as an n-dimensional array of bits, with a fixed mapping between position in the bit-string and position in the array. In general, bit-fields will be the same size in corresponding dimensions, and bits from each bit-field constitute a cell (e.g., 91i). Data is moved within an emulated space by independently spatially shifting each bit-field, interpreted as an n-dimensional array. An example of shifting for 1-dimensional bit-fields is shown in 92. In general, this kind of shifting can be performed efficiently for n-dimensional bit-fields using the techniques discussed in the patent application cited above. Bits 93a that shift past the edge 95a of one dimension wrap around to the opposite edge 95b as bits 94a, and similarly with bits 93b, 93c and 93d. The shift amount and/or direction can be different in each of a sequence of RCA steps, with the amounts and directions controlled by portions (99a, 99b, 99c, 99d) of the key 99, interpreted as binary numbers. In between data shifting steps, some or all cells (such as 91i) can be updated individually, with invertibility guaranteed by having the operation performed on each cell be a permutation on the cell's state set. The choice of permutation in each such transformation can be determined by bits of the key (such as 99e). If more bits than are present in the key are desired to control the sequence of shifts and permutations, the key may be transformed in some iterative fashion to produce additional control bits.

Other Embodiments

Although some of this discussion has focused on mirroring of file system data, the methods and protocols described here are of much more general utility. File system mirroring is discussed primarily as an initial application, to help establish the repository. As noted above, the operation of the data-servers and their associated data-transmission and data-storage protocol constitute a separate business which is compatible with a wide variety of clients, and a wide variety of data-storage entities. This business and protocol will evolve with time.

It is to be understood that while the invention has been described in conjunction with the detailed description thereof, the foregoing description is intended to illustrate and not limit the scope of the invention, which is defined by the scope of the appended claims.

Other embodiments are within the scope of the following claims.

What is claimed is:

1. A method by which a plurality of client programs connected to a network deposit data items into a data repository connected to the network and avoid repeated storage of duplicated data items, the method comprising:
    depositing a data item in the data repository for a depositing client program, the depositing including
        determining a digital fingerprint from the data item using a hash function that produces digital fingerprints having a pseudorandom distribution;
        comparing the determined digital fingerprint from the deposited data item to digital fingerprints of data items already stored in the data repository;
        establishing from the comparing of digital fingerprints, without comparing the entire contents of the deposited data item to the entire contents of a data item already stored, whether a stored data item is identical to the deposited data item; and
    storing the deposited data item in the data repository if the deposited data item is not identical with any stored data item;
    wherein the stored data item is associated with a named object and an access authorization credential which is uniquely associated with a depositing client program or with a data repository user;
    wherein the access authorization credential is associated with the named object which comprises a digital fingerprint;
    wherein the named object is stored in a database;
    wherein the stored data item, in response to a request by a retrieving client program, is retrieved by using the access authorization credential to select the stored named object;
    retrieving the stored named object from the database; and
    using the digital fingerprint from the retrieved named object to return the stored data item;
    wherein the physical location or locations at which the stored data item is stored in the data repository are determined at least in part by the digital fingerprint.

2. The method of claim 1 wherein the depositing further comprises encrypting the deposited data item using a key derived from the content of the deposited data item.

3. The method of claim 2 wherein the encrypting of the deposited data item is performed by the depositing client program.

4. The method of claim 2 wherein if the deposited data item is identical to each of a plurality of data items deposited independently by a plurality of the depositing client programs and if an encryption key is independently derived from the content of each of the plurality of data items, then all of the independently derived encryption keys are the same.

5. The method of claim 2 wherein users are grouped into a plurality of families, and the depositing client program acts on behalf of a user, and the key derived from the content of the deposited data item is determined in part by which of the plurality of families the user belongs to.

6. The method of claim 1 wherein the stored data item is associated with each of a plurality of access-authorization credentials, each of which is uniquely associated with a distinct data repository user or client program.

7. The method of claim 1 wherein the stored named object is identified by information representative of the access-authorization credential.

8. The method of claim 7 wherein the information representative of the access-authorization credential is a cryptographic hash of all or part of the access-authorization credential.

9. The method of claim 8 wherein the cryptographic hash is an access identifier that uniquely identifies the stored data item for a particular user or client program.

10. The method of claim 9 wherein the data repository is the database and the physical locations at which the named-object is stored are based on an access identifier.

11. The method of claim 1 wherein the stored named object further comprises historical version information associating data items deposited at different times with different named object versions.

12. The method of claim 1 wherein named object history is preserved by creatng a new version of the named object each time that a new data item is associated with it.

13. The method of claim 12, wherein a determination of which versions of the named object to delete is based in whole or in part on the times at which the versions were created, and the intervals between these times.

14. The method of claim 1 wherein a digital time stamp hash is prepared for each of a plurality of named objects to allow a property of these named objects to be proven at a later date.

15. The method of claim 14 wherein a random or other difficult to guess element is incorporated into the digital time stamp hash for each of the plurality of named objects, to prevent the property from being proven if this element is deleted.

16. The method of claim 1 wherein it is determined that the stored data item is no longer associated with any named object and the storage space used by the stored data item is reused.

17. The method of claim 1 further comprising a challenge step to ascertain that the depositing client program has the entirety of the data item being deposited.

18. The method of claim 1 wherein user identification is required when the depositing client program is acting on behalf of a depositor user and access to the data item being deposited for the depositor user can be shared with other users.

19. The method of claim 1 wherein identity information about a depositor user associated with the depositing client program is made available to the retrieval client program, to discourage unlawful sharing of proprietary information.

20. The method of claim 19 wherein the identity information is stored in an encrypted form that users with whom the depositor has shared access to the named object can both read and decrypt.

21. The method of claim 1 wherein when the identity of a depositor user associated with the depositing client program has not been verified, restrictions are placed on the use of the access authorization credential by retrieving programs associated with other users.

22. The method of claim 21 wherein the rate of retrieving data associated with the named object is limited.

23. The method of claim 1 wherein the deposit client program runs on a client machine and is a mirroring program which determines which data items to transmit to the data repository, and wherein that determination is based at least in part on the result of a comparison of digital fingerprints establishing that certain data items are not already stored in the data repository.

24. The method of claim 1 wherein an index data item comprises fingerprints that identify a plurality of data items stored in the data repository, and the index data item is the data item that is deposited in the data repository and associated with the named object and the named object is used by the retrieving client program to retrieve one of the plurality of stored data items.

25. The method of claim 1 wherein access to the named objects can be transferred between data repository users using the access authorization credential, without communicating with the data repository.

26. The method of claim 25 wherein at least one class of data repository users is not permitted to transfer access to their named objects to other users using access-authorization credentials individually associated with their named objects.

27. The method of claim 1 wherein different physical locations comprise different hard disk drives.

28. The method of claim 1 wherein the physical locations comprise data servers linked by a network.

29. The method of claim 1 wherein establishing from the comparing of digital fingerprints, without comparing the entire contents of the deposited data item to the entire contents of a data item already stored, whether a stored data item is identical to the deposited data item comprises transmitting over the network the digital fingerprint of the deposited data item rather than the deposited data item itself.

30. The method of claim 1 wherein the depositing client program comprises a file server.

31. The method of claim 1 wherein the named objects represents a directory of a file system stored within the data repository.

32. The method of claim 1 wherein a structured item is split up into a plurality of data items with the divisions occurring at content dependent boundaries and the deposited data item is one of the plurality of data items.

33. The method of claim 1 wherein the deposited data item is one of a plurality of identical data items deposited independently by a plurality of the depositing client programs, and a corresponding plurality of retrieving client programs all share read access to the stored data item.

34. The method of claim 33 wherein a retrieving client program which does not possess an access authorization credential cannot read the stored data item.

35. The method of claim 1 wherein the data repository is the database.

36. The method of claim 1 wherein the depositing client program and the retrieving client program are the same program.

37. The method of claim 1 wherein there exists a defined protocol used by data repository client programs to communicate with the data repository and the defined protocol allows data repository clients to deposit data items without sending their full contents if identical data items are already stored in the data repository, and the defined protocol only allows data repository clients to retrieve data items indirectly, by using access authorization credentials to select named objects.

* * * * *